(12) United States Patent
Velasco

(10) Patent No.: US 10,655,595 B2
(45) Date of Patent: *May 19, 2020

(54) METHOD FOR OPERATION OF HYDROPOWER RESERVOIR WITH A 2-PARAMETER ELEVATION RULE CURVE

(71) Applicant: Horacio L. Velasco, Caracas (VE)

(72) Inventor: Horacio L. Velasco, Caracas (VE)

(*) Notice: Subject to any disclaimer, the term of this patent is extended or adjusted under 35 U.S.C. 154(b) by 0 days.

This patent is subject to a terminal disclaimer.

(21) Appl. No.: 16/185,179

(22) Filed: Nov. 9, 2018

(65) Prior Publication Data

US 2019/0093624 A1    Mar. 28, 2019

Related U.S. Application Data

(63) Continuation of application No. 15/408,855, filed on Jan. 18, 2017, now Pat. No. 10,125,740.

(60) Provisional application No. 62/331,648, filed on May 4, 2016, provisional application No. 62/279,943, filed on Jan. 18, 2016.

(51) Int. Cl.
| | | |
|---|---|---|
| *F03B 15/14* | (2006.01) | |
| *G06Q 50/06* | (2012.01) | |
| *F03B 13/08* | (2006.01) | |
| *H02K 7/18* | (2006.01) | |
| *G06Q 10/04* | (2012.01) | |
| *F03B 3/02* | (2006.01) | |

(52) U.S. Cl.
CPC .............. *F03B 15/14* (2013.01); *F03B 13/08* (2013.01); *G06Q 50/06* (2013.01); *H02K 7/1823* (2013.01); *F03B 3/02* (2013.01); *F05B 2220/706* (2013.01); *F05B 2270/20* (2013.01); *G06Q 10/04* (2013.01); *Y04S 10/54* (2013.01)

(58) Field of Classification Search
None
See application file for complete search history.

(56) References Cited

U.S. PATENT DOCUMENTS

| | | | | |
|---|---|---|---|---|
| 7,698,233 | B1* | 4/2010 | Edwards | G06Q 10/04 705/412 |
| 9,811,061 | B1* | 11/2017 | Hu | G06Q 50/06 |
| 2010/0209192 | A1* | 8/2010 | Behm | E02B 9/06 405/87 |
| 2014/0336965 | A1* | 11/2014 | Mori | B60L 58/12 702/63 |
| 2015/0357064 | A1* | 12/2015 | Legendre | E21D 9/14 376/405 |
| 2016/0077507 | A1* | 3/2016 | Sheble | G06Q 10/06 700/295 |

OTHER PUBLICATIONS

Department of the Army, U.S. Army Corps of Engineers, Hydrologic Engineering Requirements for Reservoirs, Oct. 31, 1997, pp. 1-1 to 18-4 (Year: 1997).*

(Continued)

*Primary Examiner* — Jason Lin
(74) *Attorney, Agent, or Firm* — Lott & Fisher, PL

(57) ABSTRACT

Disclosed herein is a novel method for operating a hydropower reservoir which is an improvement over the existing single-parameter (the current month) USACE Rule Curve approach, the improvement comprising the consideration of a second parameter, namely the water level of the reservoir at the beginning of the month, in the decision-making process for operation of the reservoir.

3 Claims, 32 Drawing Sheets

(56) References Cited

OTHER PUBLICATIONS

Chang et al., "Optimizing the reservoir operating rule curves by genetic algorithms", Mar. 14, 2005, Wiley InterScience, Hydrol. Process. 19, pp. 2277-2289 (Year: 2005).*

* cited by examiner

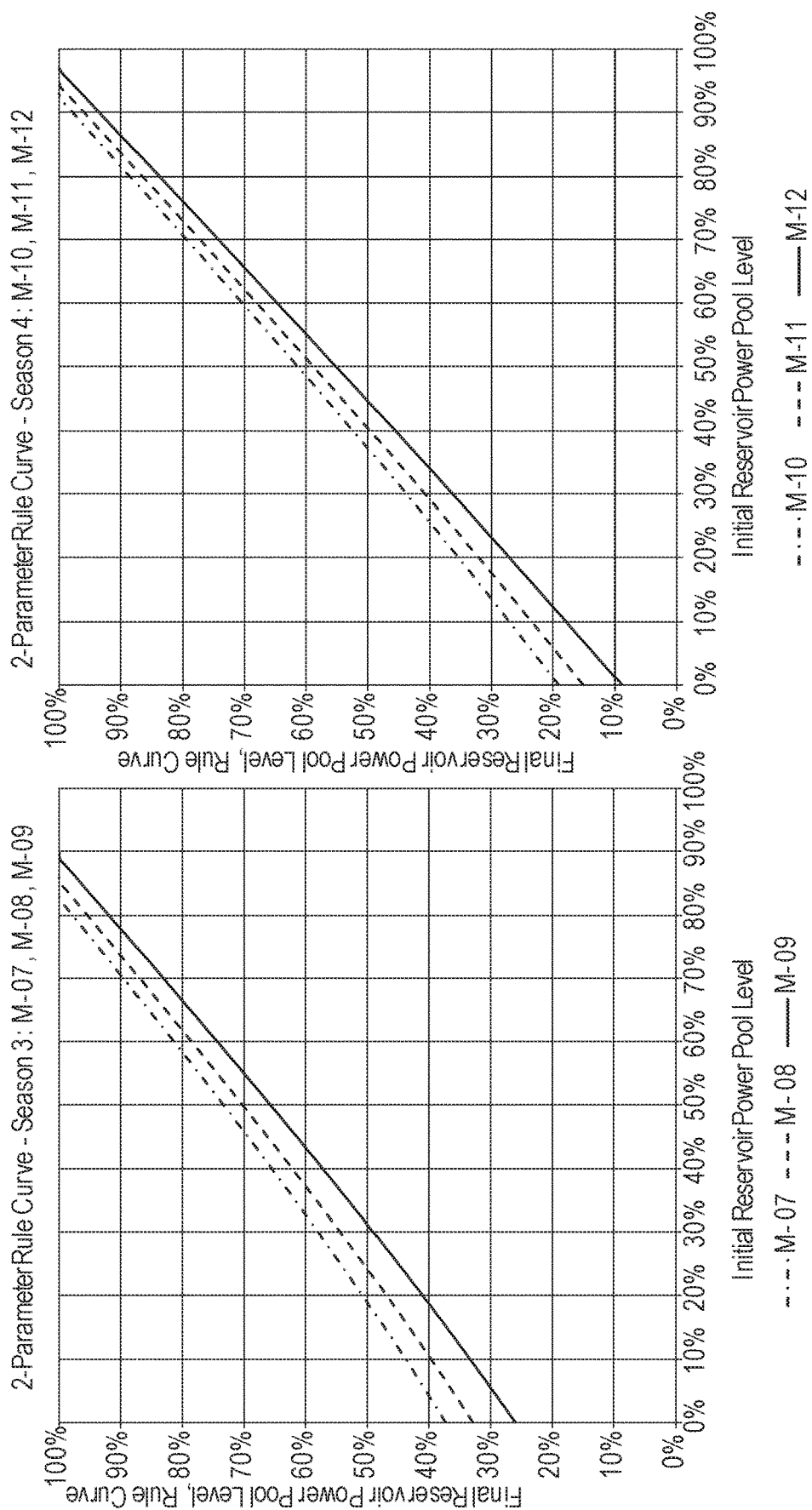

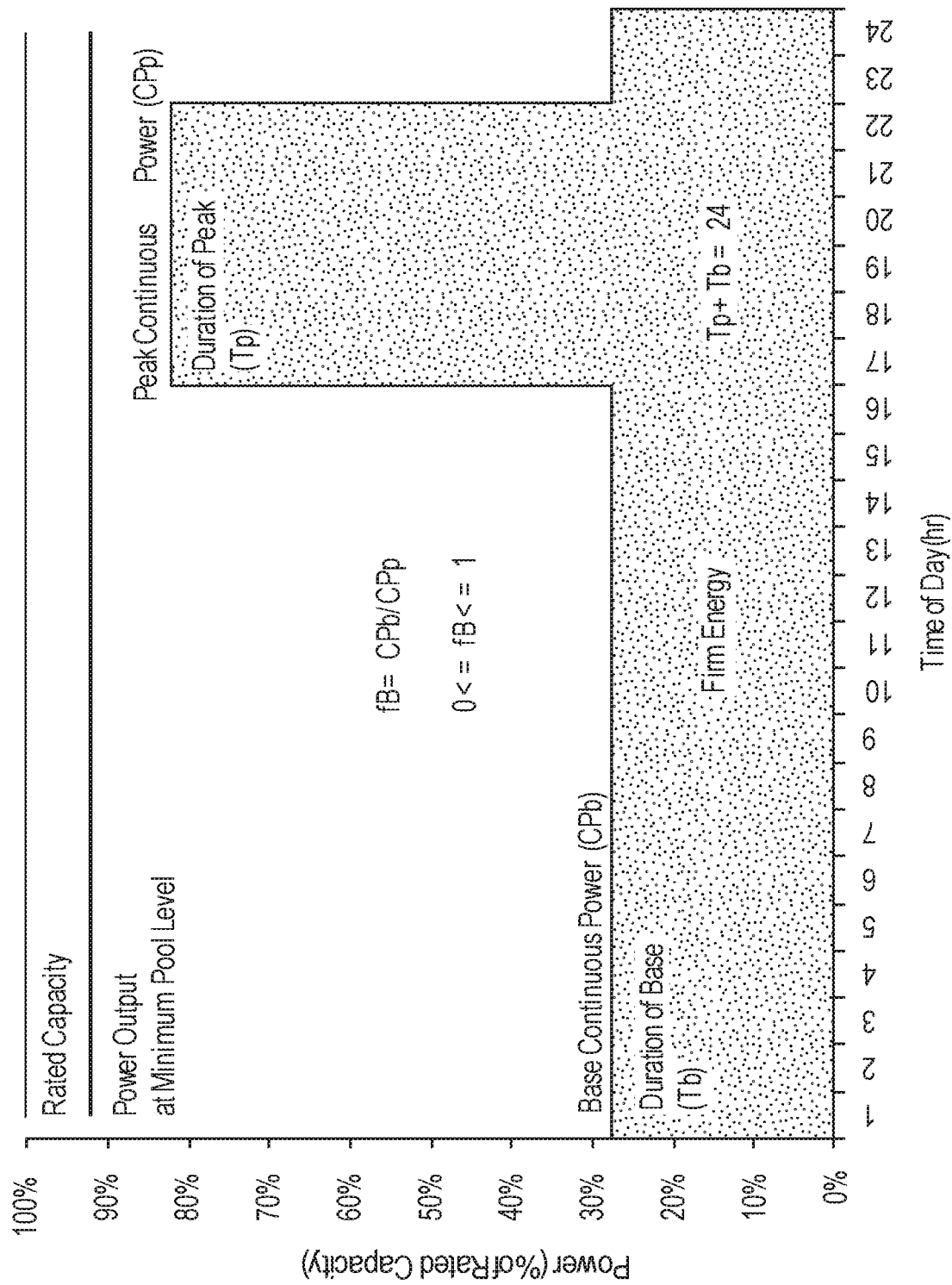

FIGURE 4

| Month Parameter | Jan | Feb | Mar | Apr | May | Jun | Jul | Ago | Sep | Oct | Nov | Dic | Annual |
|---|---|---|---|---|---|---|---|---|---|---|---|---|---|
| Days in period | 31 | 28 | 31 | 30 | 31 | 30 | 31 | 31 | 30 | 31 | 30 | 31 | 365 |
| Flow (m3/s) | 1,230 | 926 | 784 | 1,423 | 2,475 | 4,090 | 4,212 | 4,185 | 3,355 | 2,509 | 2,285 | 1,831 | 2,427 |
| Rainfall (mm) | 19 | 33 | 57 | 197 | 262 | 377 | 320 | 361 | 311 | 230 | 172 | 77 | 2,417 |
| Evaporation (mm) | 107 | 107 | 109 | 96 | 106 | 93 | 102 | 113 | 108 | 121 | 100 | 97 | 1,258 |
| Maximum Kr*Rain - Ke*Ev (mm) | -112 | -115 | -125 | -77 | -97 | -35 | 91 | 119 | 31 | -5 | -32 | -79 | -436 |

FIGURE 5

| Level (masl) | Area (km2) | Storage (mill. m3) | Level (masl) | Area (km2) | Storage (mill. m3) |
|---|---|---|---|---|---|
| 280 | 0 | 0 | 360 | 146 | 3,336 |
| 340 | 55 | 1,456 | 361 | 153 | 3,485 |
| 341 | 57 | 1,512 | 362 | 161 | 3,643 |
| 342 | 60 | 1,571 | 363 | 170 | 3,809 |
| 343 | 63 | 1,632 | 364 | 180 | 3,984 |
| 344 | 66 | 1,697 | 365 | 191 | 4,170 |
| 345 | 70 | 1,765 | 366 | 203 | 4,367 |
| 346 | 74 | 1,837 | 367 | 217 | 4,577 |
| 347 | 78 | 1,914 | 368 | 232 | 4,802 |
| 348 | 83 | 1,994 | 369 | 249 | 5,042 |
| 349 | 87 | 2,079 | 370 | 268 | 5,300 |
| 350 | 92 | 2,168 | 371 | 289 | 5,578 |
| 351 | 96 | 2,262 | 372 | 312 | 5,879 |
| 352 | 101 | 2,360 | 373 | 338 | 6,203 |
| 353 | 106 | 2,464 | 374 | 366 | 6,555 |
| 354 | 111 | 2,572 | 375 | 398 | 6,937 |
| 355 | 116 | 2,685 | 376 | 433 | 7,353 |
| 356 | 121 | 2,804 | 377 | 471 | 7,805 |
| 357 | 127 | 2,928 | 378 | 514 | 8,297 |
| 358 | 133 | 3,057 | 379 | 560 | 8,834 |
| 359 | 139 | 3,193 | 380 | 611 | 9,419 |

FIGURE 6

| Discharge Level (masl) | Flow (m3/s) | Discharge Level (masl) | Flow (m3/s) |
|---|---|---|---|
| 277 | 400 | 285 | 4,000 |
| 278 | 600 | 286 | 7,000 |
| 280 | 1,200 | 287 | 10,000 |
| 283 | 2,000 | 288 | 25,000 |

FIGURE 7

| Case | fB | Installed Capacity (MW) | Continuous Power Output (MW) Peak Time (4 hr/day) | Continuous Power Output (MW) Base Time (20 hr/day) | Firm Energy Yield (GW-h/year) |
|---|---|---|---|---|---|
| Case 1 | 1.00 | 3,800 | 765.2 | 765.2 | 6,703 |
| Case 2 | 0.40 | 3,800 | 1,517.9 | 607.2 | 6,649 |

FIGURE 8

| Month | Case 1, fB = 1.00 | | Case 2, fB = 0.40 | |
|---|---|---|---|---|
| | Unrestricted A10 (mill. m3 x m) | Restricted A20 (mill. m3 x m) | Unrestricted A10 (mill. m3 x m) | Restricted A20 (mill. m3 x m) |
| Jan / 01 | 205,727 | 134,353 | 207,016 | 134,415 |
| Feb / 02 | 104,179 | 89,071 | 103,916 | 89,325 |
| Mar / 03 | 52,365 | 0 | 54,382 | 0 |
| Apr / 04 | 236,045 | 78,685 | 240,993 | 79,197 |
| May / 05 | 416,628 | 0 | 424,534 | 0 |
| Jun / 06 | 599,164 | 0 | 609,984 | 0 |
| Jul / 07 | 540,250 | 0 | 550,154 | 0 |
| Aug / 08 | 586,989 | 23,888 | 597,649 | 24,226 |
| Sep / 09 | 481,959 | 175,034 | 490,884 | 175,172 |
| Oct / 10 | 467,973 | 322,473 | 467,386 | 322,078 |
| Nov / 11 | 414,978 | 356,506 | 414,369 | 356,240 |
| Dec / 12 | 308,329 | 248,265 | 311,965 | 248,043 |

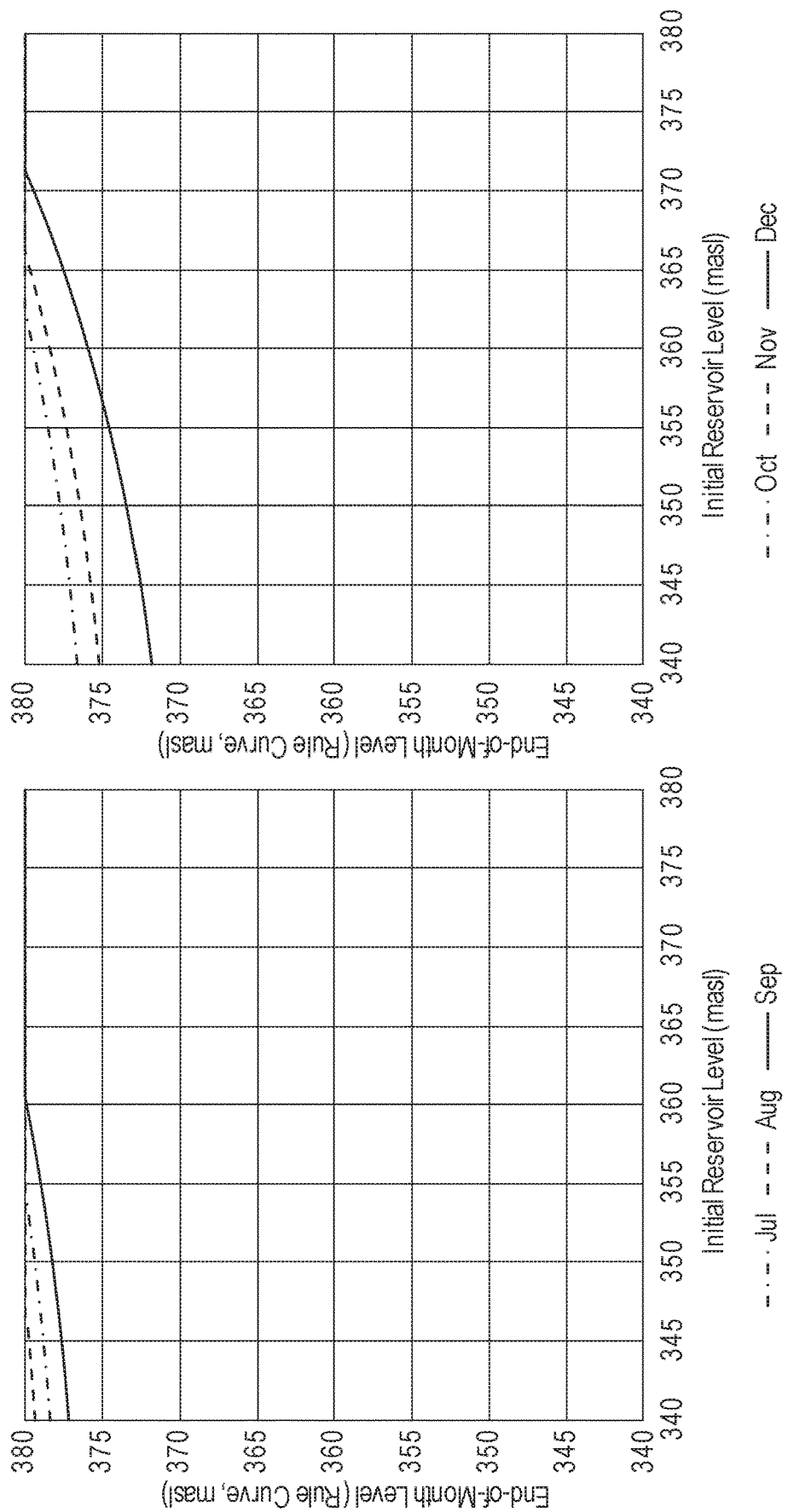

FIGURE 13

| Month | Case 1, fB = 1.00 | | Case 2, fB = 0.40 | |
| --- | --- | --- | --- | --- |
| | Storage (mill.m3) | Reservoir Level (masl) | Storage (mill.m3) | Reservoir Level (masl) |
| Jan / 01 | 8,312 | 378.0 | 8,316 | 378.0 |
| Feb / 02 | 7,115 | 375.4 | 7,121 | 375.4 |
| Mar / 03 | 5,398 | 370.4 | 5,405 | 370.4 |
| Apr / 04 | 3,489 | 361.0 | 3,493 | 361.1 |
| May / 05 | 2,494 | 353.3 | 2,492 | 353.3 |
| Jun / 06 | 1,456 | 340.0 | 1,456 | 340.0 |
| Jul / 07 | 1,456 | 340.0 | 1,456 | 340.0 |
| Aug / 08 | 1,907 | 346.9 | 1,910 | 347.0 |
| Sep / 09 | 4,390 | 366.1 | 4,388 | 366.1 |
| Oct / 10 | 6,731 | 374.5 | 6,727 | 374.5 |
| Nov / 11 | 9,331 | 379.9 | 9,327 | 379.8 |
| Dec / 12 | 9,419 | 380.0 | 9,419 | 380.0 |

FIGURE 18

|  | Case 1 | | Case 2 | |
| --- | --- | --- | --- | --- |
|  | Unrestricted A10 GW-h/year | Restricted A20 GW-h/year | Unrestricted A10 Gw-h/year | Restricted A20 GW-h/year |
| 2-Parameter Rule Curve | 17,337 | 16,925 | 17,323 | 16,914 |
| Combination Maximum | 17,337 | 16,925 | 17,323 | 16,914 |
| Extreme Values Minimum | 13,610 | 13,593 | 13,597 | 13,580 |
| USACE Rule Curve | 13,610 | | 13,632 | |

FIGURE 19

|  | Weight 2-Parameter | Case 1 | | Case 2 | |
|---|---|---|---|---|---|
|  |  | Unrestricted A10 GW-h/year | Restricted A20 GW-h/year | Unrestricted A10 GW-h/year | Restricted A20 GW-h/year |
| 2-Parameter Rule Curve |  | 17,337 | 16,925 | 17,323 | 16,914 |
| Linear Combination on Levels | 0.90 | 17,070 | 16,186 | 17,057 | 16,174 |
|  | 0.80 | 16,701 | 15,492 | 16,689 | 15,480 |
|  | 0.70 | 16,282 | 14,974 | 16,270 | 14,962 |
|  | 0.60 | 15,880 | 14,594 | 15,869 | 14,582 |
|  | 0.50 | 15,484 | 14,310 | 15,473 | 14,297 |
|  | 0.40 | 15,083 | 14,096 | 15,074 | 14,083 |
|  | 0.30 | 14,687 | 13,928 | 14,678 | 13,915 |
|  | 0.20 | 14,305 | 13,797 | 14,296 | 13,784 |
|  | 0.10 | 13,943 | 13,693 | 13,932 | 13,680 |
| USACE Rule Curve |  | 13,610 | | 13,597 | |

FIGURE 20

|  | Weight 2-Parameter | Case 1 | | Case 2 | |
|---|---|---|---|---|---|
|  |  | Unrestricted A10 GW-h/year | Restricted A20 GW-h/year | Unrestricted A10 GW-h/year | Restricted A20 GW-h/year |
| 2-Parameter Rule Curve |  | 17,337 | 16,925 | 17,323 | 16,914 |
| Linear Combination on Storage | 0.90 | 17,244 | 16,581 | 17,230 | 16,570 |
|  | 0.80 | 17,110 | 16,099 | 17,097 | 16,088 |
|  | 0.70 | 16,934 | 15,541 | 16,922 | 15,530 |
|  | 0.60 | 16,700 | 15,048 | 16,688 | 15,036 |
|  | 0.50 | 16,396 | 14,641 | 16,384 | 14,629 |
|  | 0.40 | 16,046 | 14,320 | 16,034 | 14,308 |
|  | 0.30 | 15,622 | 14,068 | 15,611 | 14,055 |
|  | 0.20 | 15,091 | 13,872 | 15,081 | 13,859 |
|  | 0.10 | 14,417 | 13,724 | 14,411 | 13,711 |
| USACE Rule Curve |  | 13,610 |  | 13,597 |  |

FIGURE 21

| Rated Capacity (MW) | Maximum Power (MW)(1) | Design Point, NS = 334 (metric) | | | Range of Head | |
|---|---|---|---|---|---|---|
| | | Net Head (m)(2) | Total Flow (m)(3) | Turbine Efficiency (4) | Maximum (m)(5) | Minimum (m)(6) |
| 2,000 | 2,200 | 82.0 | 2,908 | 0.89 | 99.5 | 55.2 |
| 2,200 | 2,420 | 81.7 | 3,211 | 0.89 | 99.5 | 54.9 |
| 2,400 | 2,640 | 81.4 | 3,516 | 0.89 | 99.5 | 54.7 |
| 2,600 | 2,860 | 81.1 | 3,824 | 0.89 | 99.5 | 54.4 |
| 2,800 | 3,080 | 80.9 | 4,129 | 0.89 | 99.5 | 54.2 |
| 3,000 | 3,300 | 80.8 | 4,429 | 0.89 | 99.5 | 54.0 |
| 3,200 | 3,520 | 80.7 | 4,730 | 0.89 | 99.5 | 53.7 |
| 3,400 | 3,740 | 80.6 | 5,032 | 0.89 | 99.5 | 53.5 |
| 3,600 | 3,960 | 80.5 | 5,335 | 0.89 | 99.5 | 53.4 |
| 3,800 | 4,180 | 80.4 | 5,639 | 0.89 | 99.5 | 53.3 |
| 4,000 | 4,400 | 80.3 | 5,943 | 0.89 | 99.5 | 53.3 |
| 4,200 | 4,620 | 80.2 | 6,248 | 0.89 | 99.5 | 53.2 |
| 4,400 | 4,840 | 80.1 | 6,554 | 0.89 | 99.5 | 53.1 |
| 4,600 | 5,060 | 80.0 | 6,860 | 0.89 | 99.5 | 53.0 |
| 4,800 | 5,280 | 79.9 | 7,168 | 0.89 | 99.5 | 52.9 |
| 5,000 | 5,500 | 79.8 | 7,476 | 0.89 | 99.5 | 52.9 |
| 5,200 | 5,720 | 79.7 | 7,785 | 0.89 | 99.5 | 52.8 |
| 5,400 | 5,940 | 79.6 | 8,095 | 0.89 | 99.5 | 52.7 |
| 5,600 | 6,160 | 79.5 | 8,406 | 0.89 | 99.5 | 52.6 |
| 5,800 | 6,380 | 79.4 | 8,718 | 0.89 | 99.5 | 52.5 |
| 6,000 | 6,600 | 79.3 | 9,030 | 0.89 | 99.5 | 52.4 |

Notes:

(1) Maximum power is 10% over the Rated Capacity.
(2) Reservoir level at the Center of Mass of the Useful Storage.
(3) Flow at full gate opening, at design head.
(4) Estimated with flow at full gate opening, at design head, combined efficiency of generator and transformer units is assumed 0.96.
(5) Estimated with reservoir at maximum power pool level, 380 masl, and power plant generating base continuous power output.
(6) Estimated with reservoir at minimum power pool level, 340 masl, and power plant generating at full power output.

FIGURE 22

| Rated Capacity (MW) | Continuous Power (MW) (1) | Firm Energy (GW-h/year) (1) | Secondary Energy (GW-h/year) | Average Energy (GW-h/year) | Plant Capacity (%) |
|---|---|---|---|---|---|
| 2,000 | 766.2 | 6,712 | 7,815 | 14,527 | 83 |
| 2,200 | 766.0 | 6,710 | 8,310 | 15,021 | 78 |
| 2,400 | 765.9 | 6,709 | 8,512 | 15,221 | 72 |
| 2,600 | 765.8 | 6,708 | 8,464 | 15,172 | 67 |
| 2,800 | 765.7 | 6,707 | 8,287 | 14,994 | 61 |
| 3,000 | 765.6 | 6,707 | 8,013 | 14,719 | 56 |
| 3,200 | 765.6 | 6,706 | 7,678 | 14,385 | 51 |
| 3,400 | 765.5 | 6,706 | 7,371 | 14,077 | 47 |
| 3,600 | 765.5 | 6,705 | 7,122 | 13,827 | 44 |
| 3,800 | 765.4 | 6,705 | 6,926 | 13,631 | 41 |
| 4,000 | 765.4 | 6,705 | 6,778 | 13,483 | 38 |
| 4,200 | 765.3 | 6,704 | 6,692 | 13,396 | 36 |
| 4,400 | 765.3 | 6,704 | 6,625 | 13,328 | 35 |
| 4,600 | 765.2 | 6,703 | 6,582 | 13,285 | 33 |
| 4,800 | 765.2 | 6,703 | 6,549 | 13,252 | 32 |
| 5,000 | 765.1 | 6,702 | 6,525 | 13,227 | 30 |
| 5,200 | 765.0 | 6,702 | 6,520 | 13,222 | 29 |
| 5,400 | 765.0 | 6,701 | 6,518 | 13,219 | 28 |
| 5,600 | 764.9 | 6,700 | 6,520 | 13,220 | 27 |
| 5,800 | 764.8 | 6,700 | 6,521 | 13,221 | 26 |
| 6,000 | 764.8 | 6,699 | 6,523 | 13,222 | 25 |

Notes:
(1) Slight differences due to variations of the efficiency at minimum head

FIGURE 23

| Rated Capacity (MW) | Continuous Power (MW) (1) | Firm Energy (GW-h/year) (1) | Secondary Energy (GW-h/year) | Average Energy (GW-h/year) | Plant Capacity (%) |
|---|---|---|---|---|---|
| 2,000 | 766.2 | 6,712 | 7,887 | 14,599 | 83 |
| 2,200 | 766.0 | 6,710 | 8,533 | 15,244 | 79 |
| 2,400 | 765.9 | 6,709 | 9,032 | 15,741 | 75 |
| 2,600 | 765.8 | 6,708 | 9,431 | 16,139 | 71 |
| 2,800 | 765.7 | 6,707 | 9,753 | 16,460 | 67 |
| 3,000 | 765.6 | 6,707 | 10,020 | 16,726 | 64 |
| 3,200 | 765.6 | 6,706 | 10,255 | 16,962 | 61 |
| 3,400 | 765.5 | 6,706 | 10,426 | 17,132 | 58 |
| 3,600 | 765.5 | 6,705 | 10,557 | 17,262 | 55 |
| 3,800 | 765.4 | 6,705 | 10,642 | 17,347 | 52 |
| 4,000 | 765.4 | 6,705 | 10,697 | 17,402 | 50 |
| 4,200 | 765.3 | 6,704 | 10,731 | 17,435 | 47 |
| 4,400 | 765.3 | 6,704 | 10,751 | 17,455 | 45 |
| 4,600 | 765.2 | 6,703 | 10,759 | 17,463 | 43 |
| 4,800 | 765.2 | 6,703 | 10,760 | 17,463 | 42 |
| 5,000 | 765.1 | 6,702 | 10,758 | 17,460 | 40 |
| 5,200 | 765.0 | 6,702 | 10,756 | 17,457 | 38 |
| 5,400 | 765.0 | 6,701 | 10,753 | 17,454 | 37 |
| 5,600 | 764.9 | 6,700 | 10,751 | 17,451 | 36 |
| 5,800 | 764.8 | 6,700 | 10,748 | 17,448 | 34 |
| 6,000 | 764.8 | 6,699 | 10,746 | 17,445 | 33 |

Notes:
(1) Slight differences due to variations of the efficiency at minimum head

FIGURE 24

| Rated Capacity (MW) | Continuous Power (MW) (1) | Firm Energy (GW-h/year) (1) | Secondary Energy (GW-h/year) | Average Energy (GW-h/year) | Plant Capacity (%) |
|---|---|---|---|---|---|
| 2,000 | 766.2 | 6,712 | 7,884 | 14,595 | 83 |
| 2,200 | 766.0 | 6,710 | 8,491 | 15,202 | 79 |
| 2,400 | 765.9 | 6,709 | 8,933 | 15,642 | 74 |
| 2,600 | 765.8 | 6,708 | 9,284 | 15,992 | 70 |
| 2,800 | 765.7 | 6,707 | 9,559 | 16,266 | 66 |
| 3,000 | 765.6 | 6,707 | 9,793 | 16,500 | 63 |
| 3,200 | 765.6 | 6,706 | 9,987 | 16,693 | 60 |
| 3,400 | 765.5 | 6,706 | 10,102 | 16,808 | 56 |
| 3,600 | 765.5 | 6,705 | 10,180 | 16,886 | 54 |
| 3,800 | 765.4 | 6,705 | 10,229 | 16,935 | 51 |
| 4,000 | 765.4 | 6,705 | 10,249 | 16,954 | 48 |
| 4,200 | 765.3 | 6,704 | 10,266 | 16,970 | 46 |
| 4,400 | 765.3 | 6,704 | 10,276 | 16,980 | 44 |
| 4,600 | 765.2 | 6,703 | 10,282 | 16,985 | 42 |
| 4,800 | 765.2 | 6,703 | 10,283 | 16,986 | 40 |
| 5,000 | 765.1 | 6,702 | 10,281 | 16,983 | 39 |
| 5,200 | 765.0 | 6,702 | 10,279 | 16,981 | 37 |
| 5,400 | 765.0 | 6,701 | 10,277 | 16,978 | 36 |
| 5,600 | 764.9 | 6,700 | 10,275 | 16,975 | 35 |
| 5,800 | 764.8 | 6,700 | 10,273 | 16,973 | 33 |
| 6,000 | 764.8 | 6,699 | 10,271 | 16,970 | 32 |

Notes:

(1) Slight differences due to variations of the efficiency at minimum head

FIGURE 25

| Rated Capacity (MW) | Firm Energy (1) (GW-h/year) | Mean Annual Energy | | | Secondary Annual Energy | | |
|---|---|---|---|---|---|---|---|
| | | USACE (GW-h/year) | A10 (GW-h/year) | A20 (GW-h/year) | USACE (GW-h/year) | A10 (GW-h/year) | A20 (GW-h/year) |
| 2,000 | 6,712 | 14,527 | 14,599 | 14,595 | 7,815 | 7,887 | 7,884 |
| 2,200 | 6,710 | 15,021 | 15,244 | 15,202 | 8,310 | 8,533 | 8,491 |
| 2,400 | 6,709 | 15,221 | 15,741 | 15,642 | 8,512 | 9,032 | 8,933 |
| 2,600 | 6,708 | 15,172 | 16,139 | 15,992 | 8,464 | 9,431 | 9,284 |
| 2,800 | 6,707 | 14,994 | 16,460 | 16,266 | 8,287 | 9,753 | 9,559 |
| 3,000 | 6,707 | 14,719 | 16,726 | 16,500 | 8,013 | 10,020 | 9,793 |
| 3,200 | 6,706 | 14,385 | 16,962 | 16,693 | 7,678 | 10,255 | 9,987 |
| 3,400 | 6,706 | 14,077 | 17,132 | 16,808 | 7,371 | 10,426 | 10,102 |
| 3,600 | 6,705 | 13,827 | 17,262 | 16,886 | 7,122 | 10,557 | 10,180 |
| 3,800 | 6,705 | 13,631 | 17,347 | 16,935 | 6,926 | 10,642 | 10,229 |
| 4,000 | 6,705 | 13,483 | 17,402 | 16,954 | 6,778 | 10,697 | 10,249 |
| 4,200 | 6,704 | 13,396 | 17,435 | 16,970 | 6,692 | 10,731 | 10,266 |
| 4,400 | 6,704 | 13,328 | 17,455 | 16,980 | 6,625 | 10,751 | 10,276 |
| 4,600 | 6,703 | 13,285 | 17,463 | 16,985 | 6,582 | 10,759 | 10,282 |
| 4,800 | 6,703 | 13,252 | 17,463 | 16,986 | 6,549 | 10,760 | 10,283 |
| 5,000 | 6,702 | 13,227 | 17,460 | 16,983 | 6,525 | 10,758 | 10,281 |
| 5,200 | 6,702 | 13,222 | 17,457 | 16,981 | 6,520 | 10,756 | 10,279 |
| 5,400 | 6,701 | 13,219 | 17,454 | 16,978 | 6,518 | 10,753 | 10,277 |
| 5,600 | 6,700 | 13,220 | 17,451 | 16,975 | 6,520 | 10,751 | 10,275 |
| 5,800 | 6,700 | 13,221 | 17,448 | 16,973 | 6,521 | 10,748 | 10,273 |
| 6,000 | 6,699 | 13,222 | 17,445 | 16,970 | 6,523 | 10,746 | 10,271 |

Notes:
(1) Slight differences due to variations of the efficiency at minimum head

METHOD FOR OPERATION OF HYDROPOWER RESERVOIR WITH A 2-PARAMETER ELEVATION RULE CURVE

CLAIM OF PRIORITY

This application is a continuation of U.S. patent application Ser. No. 15/408,855 filed Jan. 18, 2017, now U.S. Pat. No. 10,125,740, which claims the benefit of U.S. Provisional Patent Application Ser. No. 62/279,943 filed on Jan. 18, 2016, and U.S. Provisional Patent Application Ser. No. 62/331,648 filed on May 4, 2016, the contents of which are incorporated herein by reference.

FIELD OF INVENTION

The present invention relates to optimizing the operation of and power collected from a hydro powered reservoir.

BACKGROUND OF THE INVENTION

Many studies on planning and operation of reservoirs for power production rely on the operational strategy from the United States Army Corps of Engineers ("USACE") described in reference EM-1110-2-1701 entitled "Engineering and Design, Hydropower" (the "USACE Reference"), which aims to preserve the firm energy of the reservoir and then to produce secondary energy. The operational strategy presented is based on two aspects: (a) the actual control strategy, and (b) a set of control values of the reservoir level, which acts as a threshold in the decision-making process, and is called the Rule Curve. This Rule Curve has one parameter, which is the current month of the year (it is a 1-parameter set), and gives a control value of the reservoir level at the end of each calendar month.

The operational strategy to use with this set of control parameters is simple, stated as follows: (i) at the beginning of the current month simulate the operation of the reservoir/powerhouse generating only the continuous power and firm energy; (ii) if the simulated end-of-month level in the reservoir falls below the control value, generate only the firm energy and continuous power; (iii) if the simulated end-of-month level is greater than the control value, generate as much energy as possible until the level reaches down to the control value, always limited by the power-plant capacity. The set of control values is fixed over the years and gives one control value of the end-of-month reservoir level for each calendar month.

The Rule Curve and the continuous power/firm energy yield are obtained by a recursive backward simulation algorithm until the maximum firm yield and continuous power are obtained. The calculation of the continuous power/firm energy yield is made by trial-and-error, generating only the trial continuous power under the assumed daily operation pattern, and calculating the required level at the beginning of each time period considering the reservoir at the minimum power pool level at the end of the time series; the reservoir fails if it requires a level greater than the maximum power pool level. This backward simulation is repeated until the maximum continuous power/firm energy yield is obtained.

The Rule Curve is the envelope of the maximum end-of-month levels obtained in the backward simulation which gives the firm energy yield and continuous power. As a by-product of this procedure, at least one value of the Rule Curve is the top of the power pool. The Rule Curve can be updated periodically as more hydrological information is collected during the actual operation of the reservoir, or bathymetric studies are undertaken to analyze sediment deposition and update the reservoir elevation-area-storage curve, or other significant event occurs.

FIG. 1 shows a typical Rule Curve (RC) for a reservoir, following the USACE guidelines. It shows also the minimum and maximum power pool levels, and the general recommendation for operation of the power-plant. Note that one level of the Rule Curve equals the maximum normal power pool level. As can be seen, under the USACE operational strategy, the control of the reservoir operation depends only on the current time of the year. There is no influence of the current state of the reservoir system in the selection of the value of the end-of-month control level, nor is there an explicit maximization of the mean energy generated by the reservoir.

SUMMARY OF THE INVENTION

Disclosed herein is a new approach to generate an improvement for the Rule Curve, to be used with the control strategy already stated in the USACE Reference. The improvement is the inclusion of a parameter which represents the actual state of the reservoir system in the decision-making process. The parameters used, then, are current time of the year and current reservoir level (at the beginning of the month). This approach is a two-tiered scheme:

1) The estimation of the value of a composite parameter of the reservoir operation, $\Delta V\, H_{ef}$ (by month or any suitable time-period), using the available hydrological data (inflow, rainfall, evaporation), for the generation of continuous power and firm energy; this composite parameter represents the monthly maximum effective potential energy withdrawn from (negative values) or stored into the reservoir (positive values). The calculations are done with additional data processing at each time step to calculate the monthly variation of the effective potential energy withdrawn from or stored into the reservoir. At the end of the simulation, the algorithm takes the upper envelope of the maximum monthly values of the composite potential energy parameter, instead of the envelope of the maximum values of the end-of-month storage.

2) The use of the composite monthly maximum parameter $\Delta V\, H_{ef}$ to estimate the end-of-month control reservoir levels. This task is done by solving the mass balance and net head equations with the appropriate efficiency, to give an end-of-month level to any given beginning-of-month reservoir level within the range of admissible levels in the reservoir power pool. Since the mass-balance equations involve the effective rainfall and evaporation over the reservoir surface, the algorithm takes a conservative approach and evaluates the mass balance with the minimum monthly values of the difference between the effective rainfall and effective evaporation. This procedure provides a one-to-one relationship between the initial reservoir level and the recommended final level for any month. In real-time operations, this calculation can be made with the best estimate of the rainfall and evaporation over the reservoir, to produce the end-of-month Rule Curve levels, to further enhance the estimate of the end-of-month reservoir levels.

An example of the 2-Parameter Elevation Rule Curve is presented in FIG. 2, in which the end-of-month level is given as a function of the beginning-of-month level and the time of the year and the minimum monthly values of the difference between effective rainfall and evaporation over the reservoir surface. The rule curve ranges from the minimum to the maximum reservoir power pool levels. For clarity purposes, it is presented in four seasons, each with duration of three months.

The calculations are simple and straightforward in the derivation of the composite parameter and the estimation of the Rule Curve. There is no maximization algorithm, only the consideration of a parameter representative of the current state of the system. The use of this 2-Parameter Rule Curve with the control strategy presented by USACE can increase the annual energy output of the reservoirs while maintaining the firm energy yield. The increase in total energy can range from 2-5% up to 20-25% and 50-60% in some applications, depending on the characteristics of the reservoir and powerplant system, such as storage, rated capacity, net head variations and inflow.

BRIEF DESCRIPTION OF THE DRAWINGS

FIG. 3 depicts the operating pattern used to simulate the generation of continuous power and firm energy.

FIG. 4 depicts a tabulation of the hydrological parameters of the Tayucai Reservoir.

FIG. 5 depicts a tabulation of the Reservoir Level-Area-Storage Curve for the Tayucai Reservoir.

FIG. 6 depicts a tabulation of the Tailwater Discharge Levels for the Tayucai Power-Plant.

FIG. 7 depicts a tabulation of the Continuous Power Output and Finn Energy Yield for a Backward Simulation at the Tayucai Reservoir, Design Head 80 in.

FIG. 8 depicts a tabulation of the Maximum Parameters PTX at the Tayucai Reservoir; Installed Capacity 3,800 MW; Design Head 80 in; Design Flow 5,667 m3/s.

FIG. 13 depicts a tabulation of the Tayucai Reservoir USACE Rule Curve, End-of-Month Storage and Reservoir Levels; Installed Capacity 3,800 MW; Design Head 80 in; Design Flow 5,667 m3/s.

FIG. 18 depicts a tabulation of Mean Annual Energy, Combined Extreme Values, 2-Parameter and USACE Rule Curves for Tayucai Reservoir; 3,800 MW; Design Head 80 mca; Design Flow 5,667 m3/s.

FIG. 19 depicts a tabulation of Mean Annual Energy, Linear Combination of Levels, 2-Parameter and USACE Rule Curves for Tayucai Reservoir, 3,800 MW; Design Head 80 in; Design Flow 5,667 m3/s.

FIG. 20 depicts a tabulation of Mean Annual Energy, Linear Combination of Storage, 2-Parameter and USACE Rule Curves for Tayucai Reservoir, 3,800 MW; Design Head 80 in; Design Flow 5,667 m3/s.

FIG. 21 depicts a tabulation of the Tayucai Powerplant Characteristics, for diverse Installed Capacities, Design Head and Design Flow.

FIG. 22 depicts a tabulation of the Tayucai Reservoir Energy Generated by the use of the USACE Rule Curve.

FIG. 23 depicts a tabulation of the Tayucai Reservoir Energy Generated by the Use of the 2-Parameter Unrestricted A10 Rule Curve and Combinations.

FIG. 24 depicts a tabulation of the Tayucai Reservoir Energy Generated by the Use of the 2-Parameter Restricted A20 Rule Curve and Combinations.

FIG. 25 depicts a tabulation of the Tayucai Reservoir Comparison of Energy Generated, by the Use of the USACE and 2-Parameter Rule Curves.

DETAILED DESCRIPTION OF INVENTION

Figure 1:
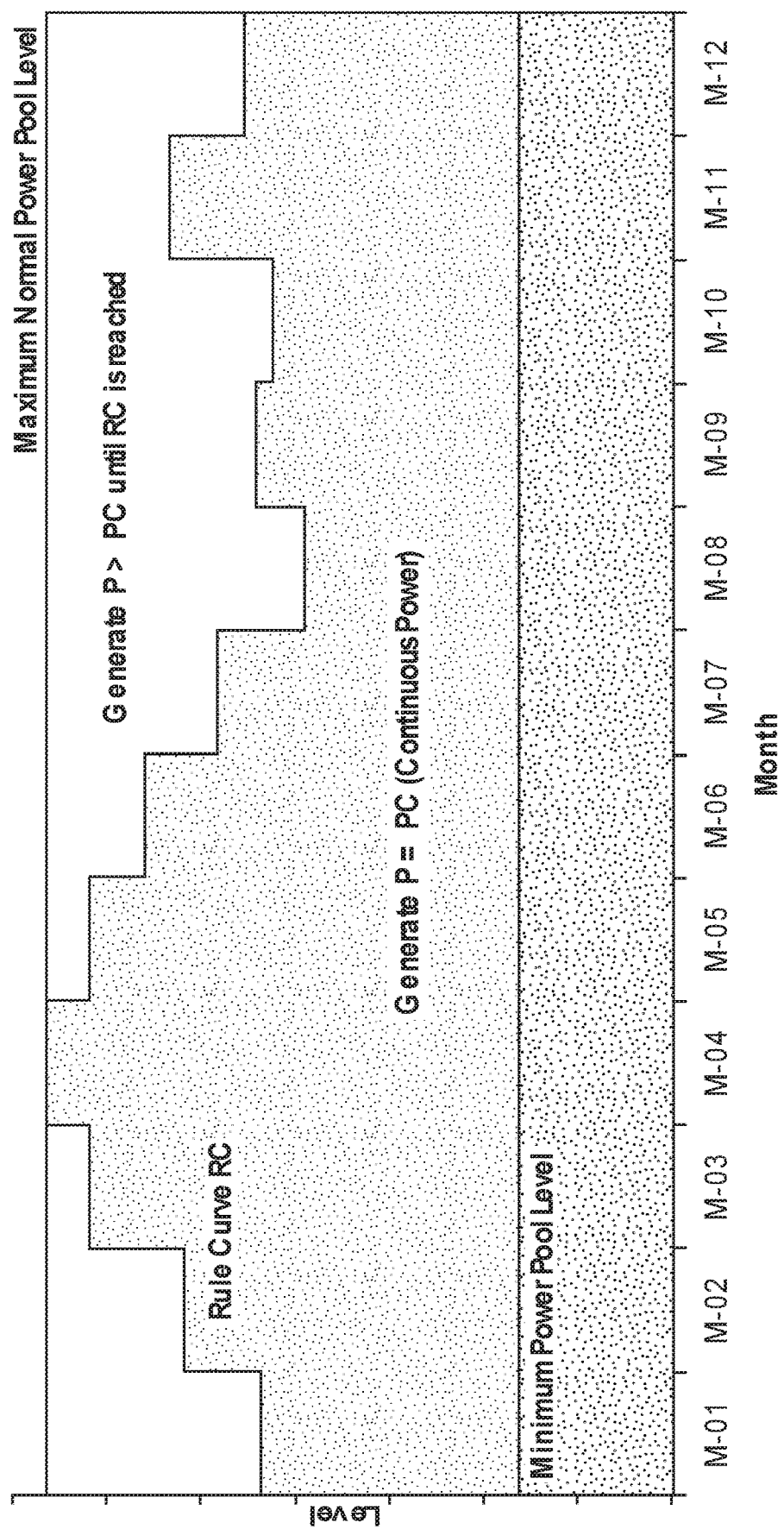
FIG. 1 depicts a typical USACE hydropower Rule Curve.
Figure 2:
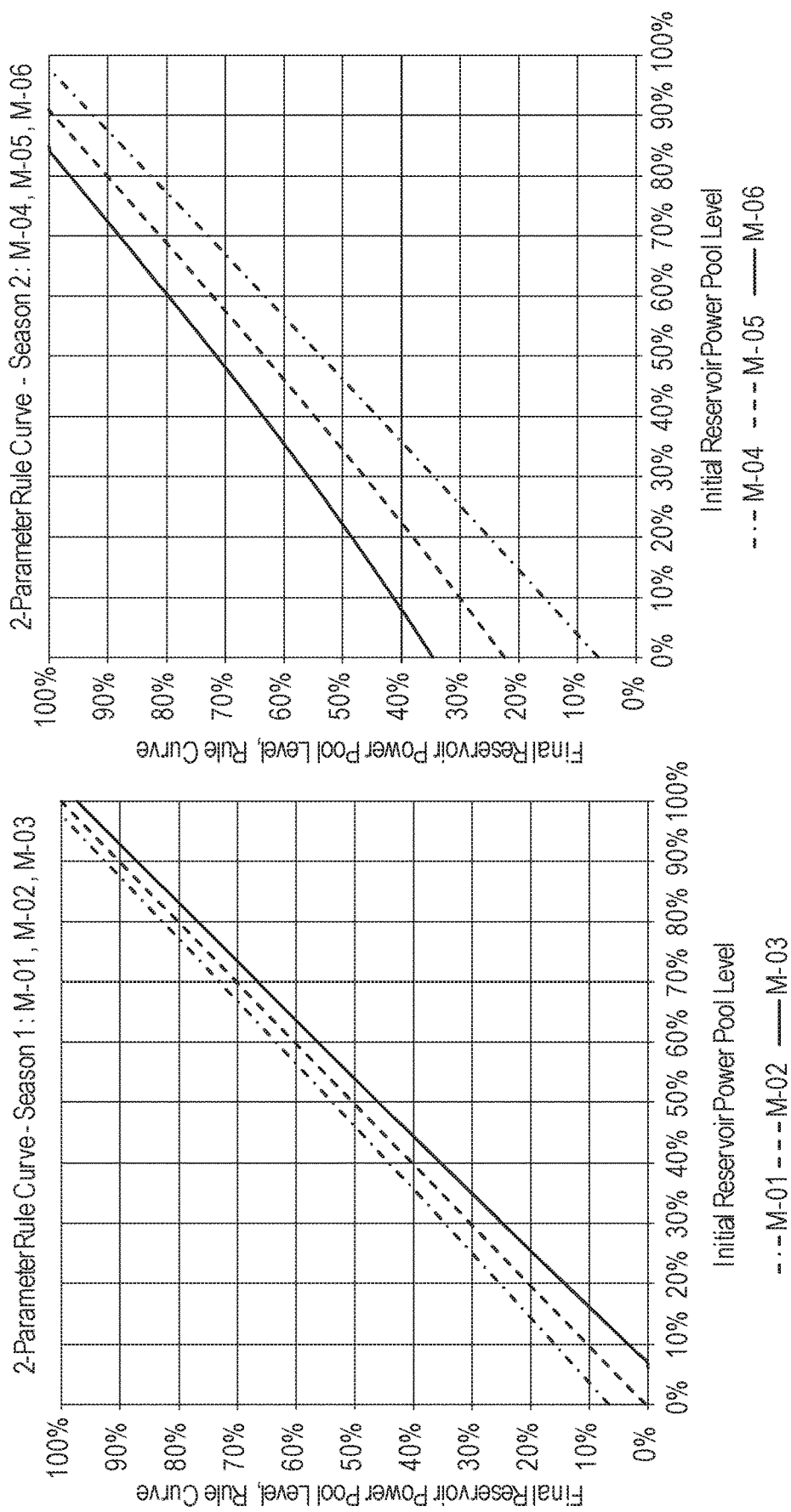
FIG. 2 depicts a typical example of the 2-Parameter Elevation Rule Curve.
Figure 9:
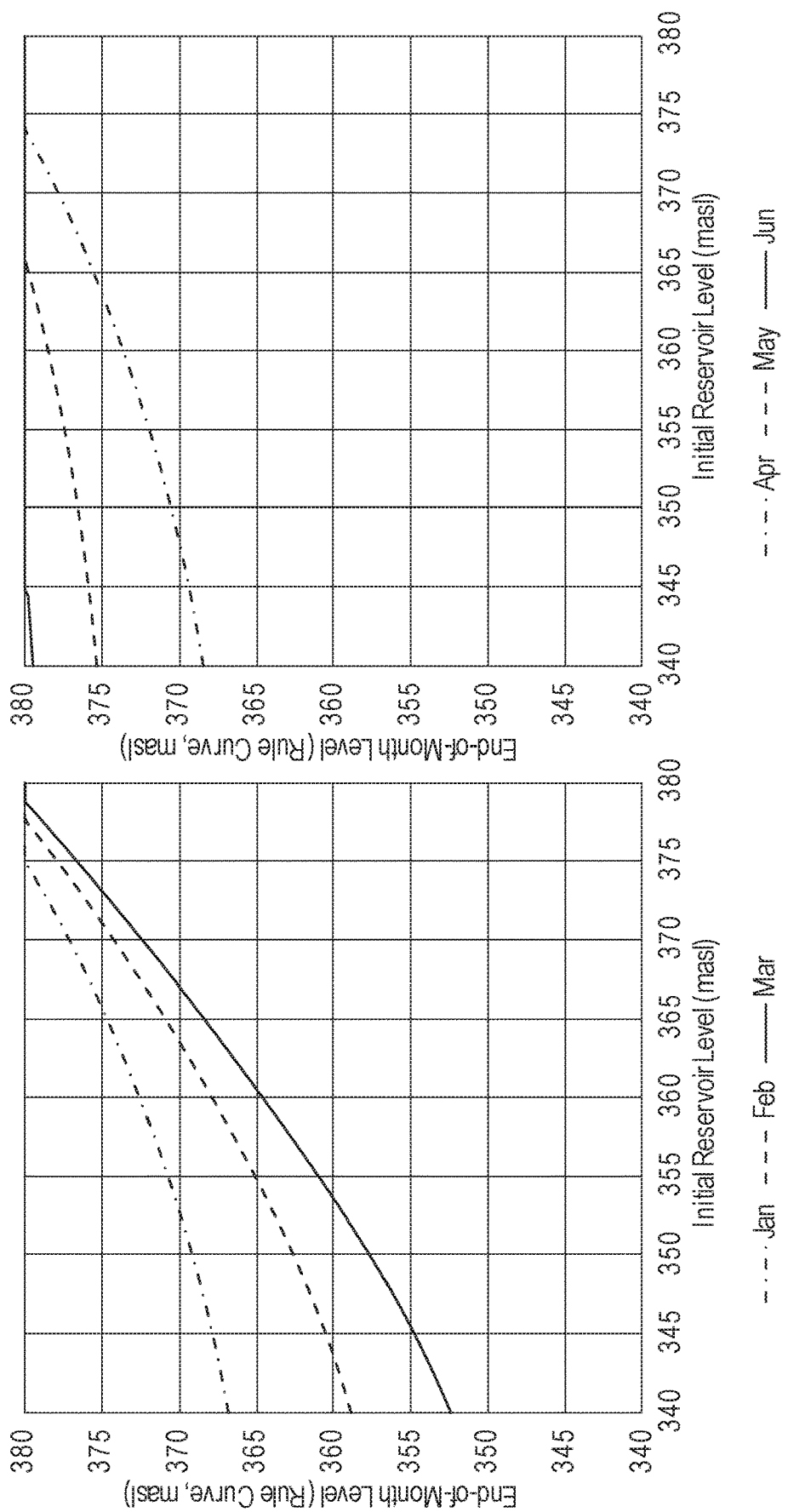
FIG. 9 depicts the estimation of the 2-Parameter Rule Curve for the simulation of Unrestricted A10 Case 1 for Tayucai Reservoir; Installed Capacity 3,800 MW; Design Head 80 in; Design Flow 5,667 m3/s.
Figure 9:
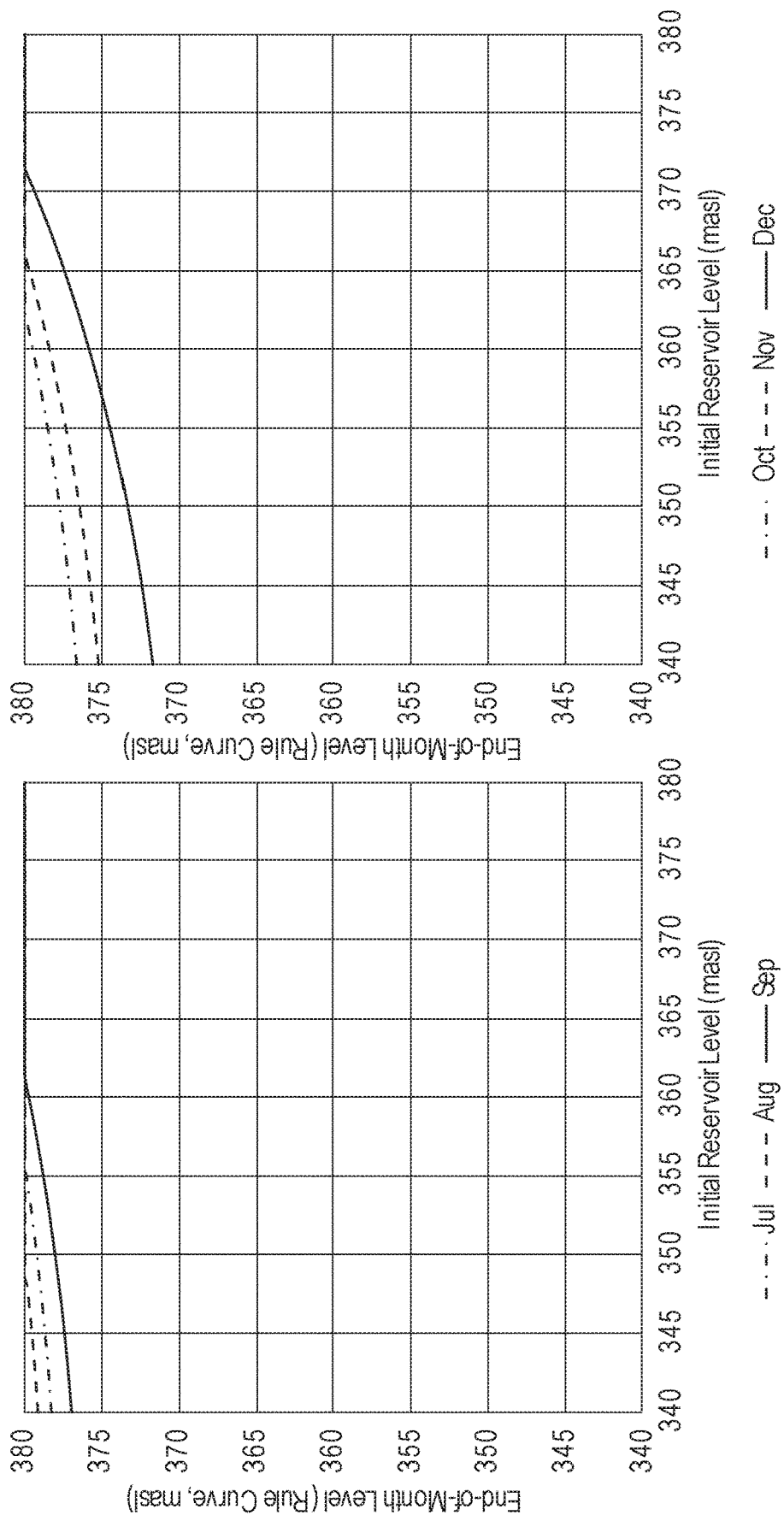
Figure 10:
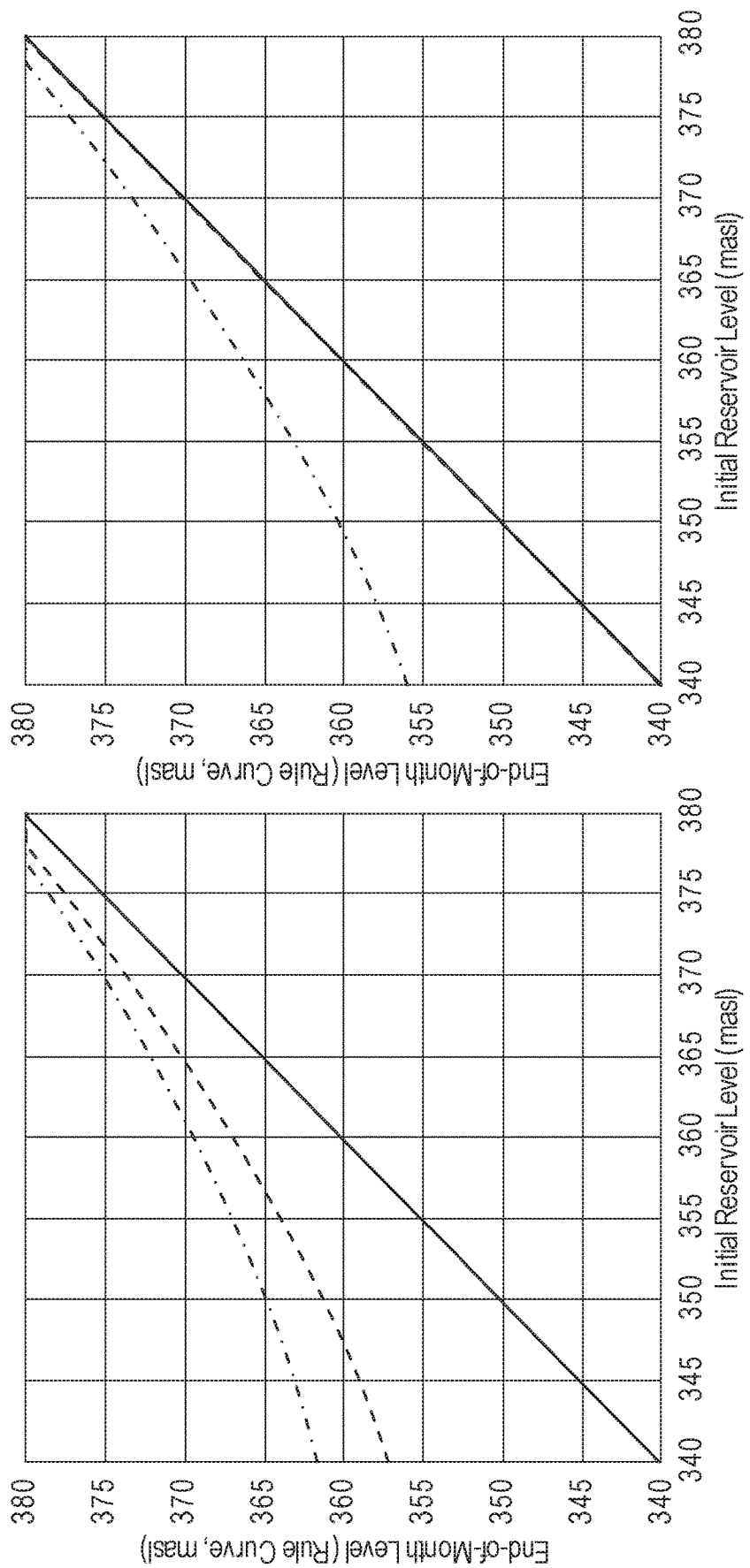
FIG. 10 depicts the estimation of the 2-Parameter Rule Curve for this simulation of Restricted A20 Case 1 for Tayucai Reservoir; Installed Capacity 3,800 MW; Design Head 80 in; Design Flow 5,667 m3/s.
Figure 10:
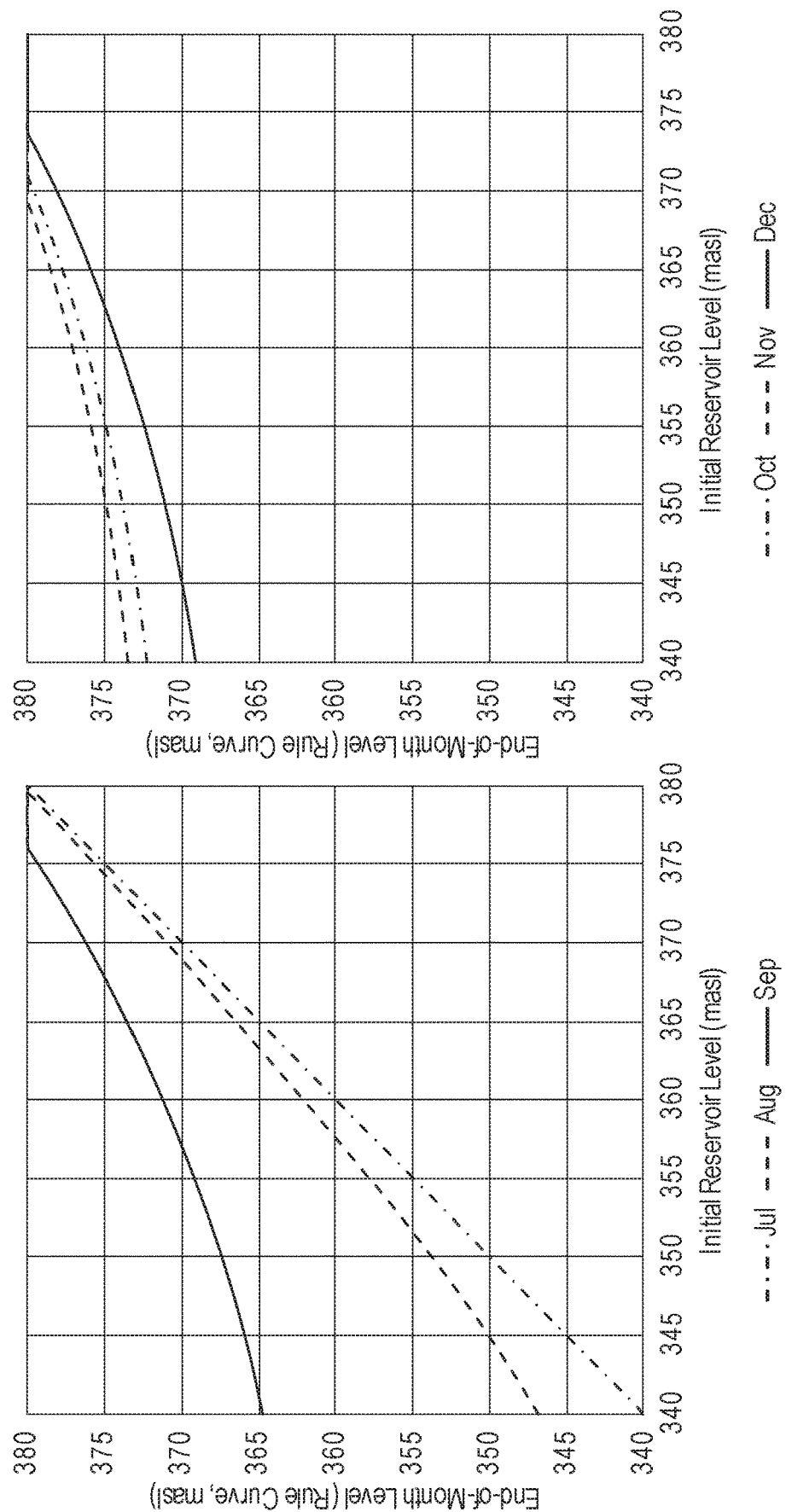
Figure 11:
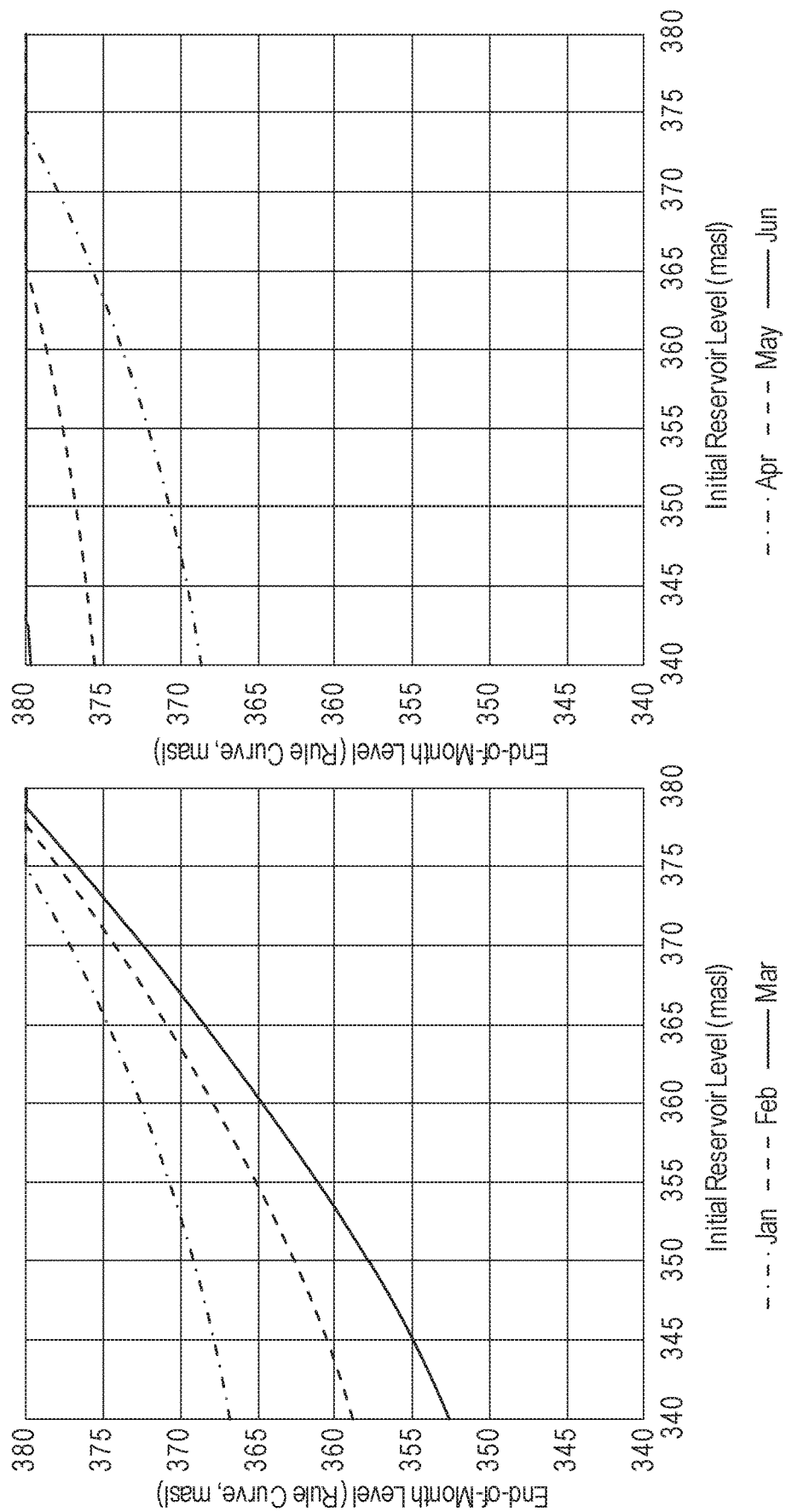
FIG. 11 depicts the estimation of the 2-Parameter Rule Curve for this simulation of Unrestricted A10 Case 2 for Tayucai Reservoir; Installed Capacity 3,800 MW; Design Head 80 in; Design Flow 5,667 m3/s.
Figure 12:
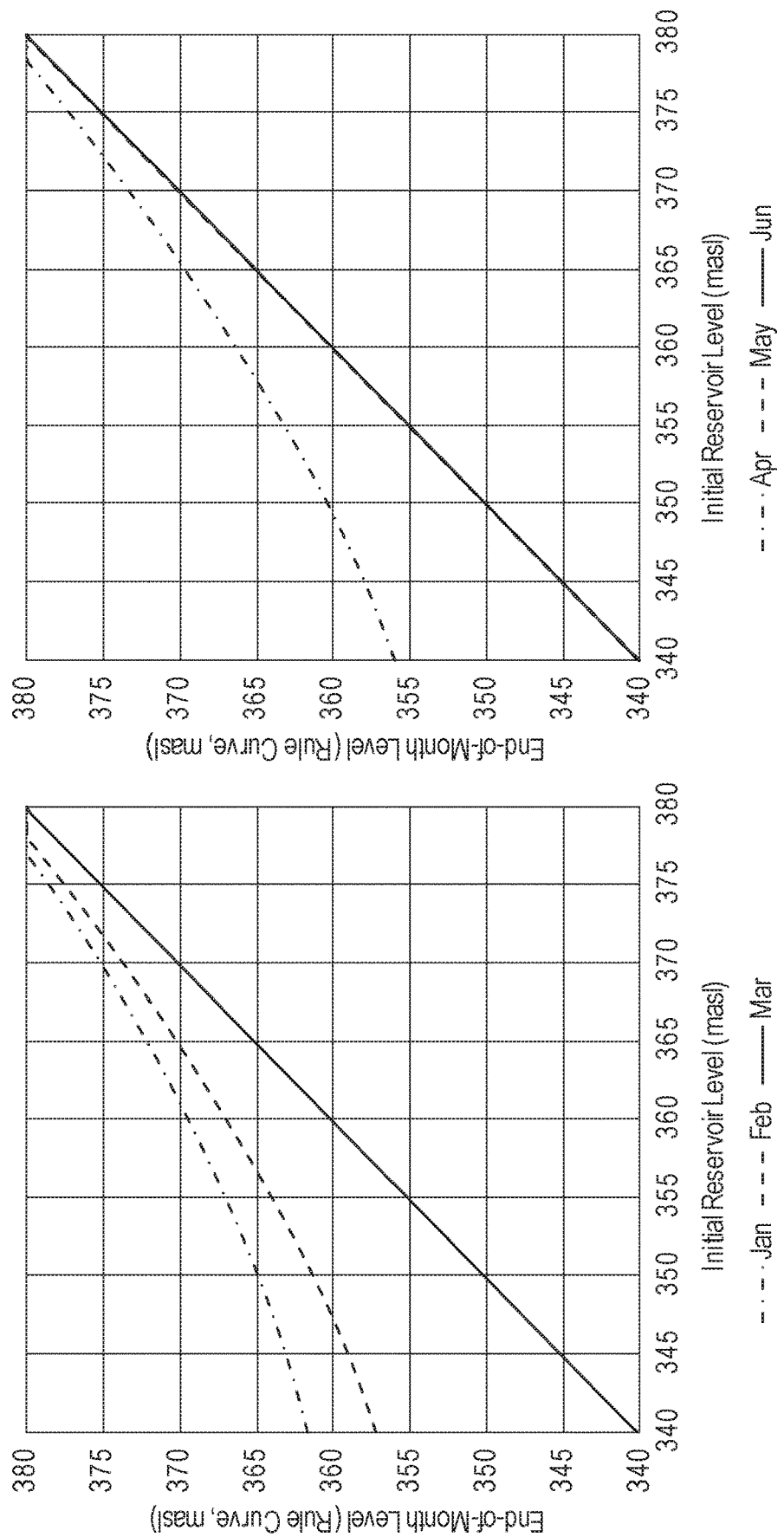
FIG. 12 depicts the estimation of the 2-Parameter Rule Curve for this simulation of Restricted A20 Case 2 for Tayucai Reservoir; Installed Capacity 3,800 MW; Design Head 80 in; Design Flow 5,667 m3/s.
Figure 12:
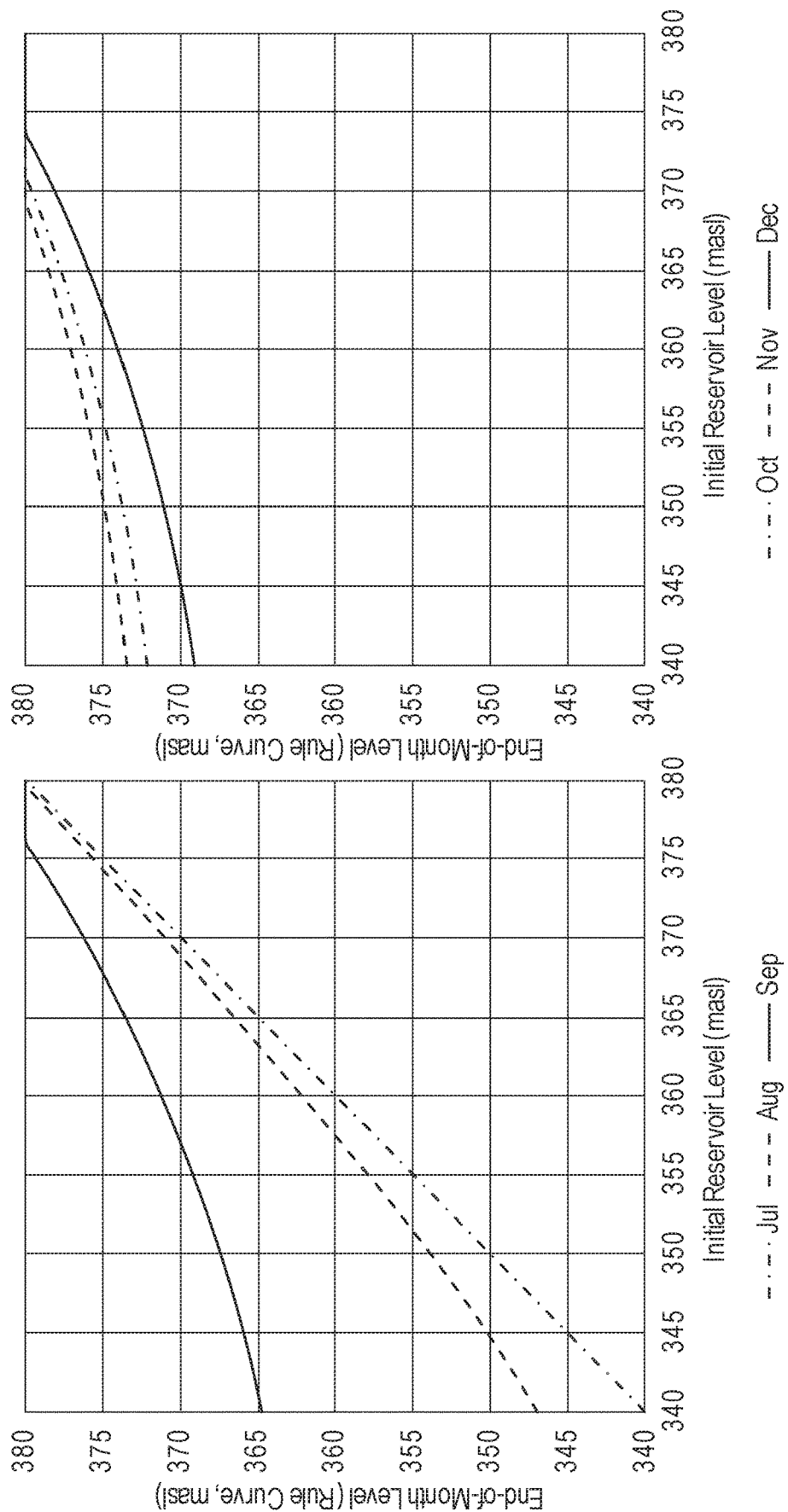

Analytical Description of the Reservoir Power Plant System

Operation Pattern for Continuous Power/Firm Energy

FIG. 3 shows the operating pattern used to simulate the generation of continuous power and firm energy. The pattern follows a base/peak load, with duration Tb and Tp, respectively. The Continuous Power is indexed to the base/peak period, CPb and CPp. The restrictions on the Continuous Power and pattern are the following:

a) CPp and CPb must be lower or equal than the power output at the minimum power pool level.

b) Total time, Tb+Tp, equals 24 hr.

c) The relationship between the base and peak continuous power, fB=CPb/CPp, lies between zero and one. A value of zero means the power-plant is dedicated to generate peak load, whereas a value of one means the plant generates in base load only.

Mass Balance of Reservoir

The mass balance of the reservoir is represented by the following recursive equations, for any given period:

$$Vf = Vi + \Delta V \quad \text{(``EQ 1'')}$$

$$\Delta V = Qinf \Delta T - Qtp \Delta Tp - Qtb \Delta Tb + \quad \text{(``EQ 2'')}$$
$$(KrR - KeEv)\text{Area} - Qeco\Delta T - Qloss\Delta T$$

Subject to the inequality constrain:

$$Vmin \leq Vf \leq Vmax \quad \text{(``EQ 3'')}$$

In which:
Vf: Volume stored in reservoir at the end of the month.
Vi: Volume stored in reservoir at the beginning of the month, known value.
ΔV: Variation on volume stored during the period, without restrictions imposed by the reservoir levels (maximum and minimum).
Qinf: Average Inflow into the reservoir during the current period.
R: Total monthly rainfall over the reservoir area during the current period.
Ev: Total monthly evaporation over the reservoir area during the current period.
Qtp: Average monthly flow into turbines during peak time, Tp.
Qtb: Average monthly flow into turbines during base time, Tb.
Qeco: Average ecological flow and other demands during the period which do not pass through the power house.
Qloss: Average water losses during the period.
Vmin: Volume stored at the minimum reservoir power pool level.
Vmax: Volume stored at the maximum reservoir power pool level.
ΔT: Time conversion factor from the units of flow into total monthly volume, for full day.
ΔTp: Time conversion factor from the units of flow into total monthly volume, for peak hours.
ΔTb: Time conversion factor from the units of flow into total monthly volume, for base hours.
Area: Average surface area of the reservoir during the period.
Kr: Effective rainfall and conversion constant.
Ke: Effective evaporation and conversion constant.

The relationship between level-area storage of the reservoir is represented by the level-area-storage curve. If the water surface level falls below the minimum power pool level, the reservoir cannot yield the required power and energy output, and the available water must be allocated to the diverse demands on a predefined priority basis. The final level is then set to the minimum power pool level. If the water level goes above the maximum power pool level, it generates a spill, which is then calculated. The final level is set to the maximum power pool level. This procedure is repeated on a month-by-month basis, for the duration of the hydrological time series available.

Power Output of Power Plant

The equations representing the power output of the power-plant are the following:

$$P = \gamma Qt\, H\, ef_t ef_g \quad \text{(“EQ 4”)}$$

$$E = Pp\Delta Tp + Pb\Delta Tb \quad \text{(“EQ 5”)}$$

Subject to the inequality constrains on the continuous power to generate firm energy:

$$Pp \geq CPp \quad \text{(EQ 6) and}$$

$$Pb \geq CPb \quad \text{(“EQ 7”)}$$

In which:
P: Power output of the power-plant, it is indexed for the generation on peak time, Pp; and base time, Pb.
CPp: Continuous power during peak time.
CPb: Continuous power during base time.
E: Total energy generated during period.
γ: specific weight of water.
Qt: water flow into the turbines, indexed for peak and base time, Qtp and Qtb.
H: average monthly net head on the turbines, indexed for peak and base time, Hp and Hb.
$ef_t$: average efficiency of the turbine units, indexed for generation at peak and base time.
$ef_g$: average combined efficiency of the generator and transformer units, it is presumed constant throughout the simulation.

Net Head

The net head is a function of the reservoir elevation, the energy losses through the conveyance systems (free-surface and pressure flow) from the reservoir into the turbines, and the tailwater elevation rating, as follows:

$$H = \text{Elev} - HL - TW \quad \text{(“EQ 8”)}$$

In which:
H: Average net head on the turbines, indexed for peak and base power.
Elev: Average surface level of reservoir during period.
HL: Average energy losses during the period, due to conveyance from reservoir into the power-plant, indexed for peak and base power. It is a function of total flow into the power-plant and unit flow into the turbines.
TW: Average tailwater level during the period, indexed for peak and base power, it is a function of total flow into the power plant, and must take into account any spillway discharges that affect the power house discharge channel levels.

Efficiency

The efficiency of the turbines is a function of the net head and unit flow on the turbines. The relationship between efficiency-head-flow is part of the data set and can be read from the efficiency hill-diagrams of typical turbines or of the installed turbines. The combined efficiency of the generator and transformer units is generally presumed constant.

Estimation of the Composite Monthly Reservoir Parameter, PT

The backward simulation algorithm used to define the continuous power and firm energy can be represented by the equations:

$$Vi = Vf - \Delta V \quad \text{(“EQ 9”)}$$

$$Pp = CPp \quad \text{(“EQ 10”)}$$

$$Pb = CPb \quad \text{(“EQ 11”)}$$

Subject to the inequality constrain:

$$V\text{min} \leq Vi \leq V\text{max} \quad \text{(“EQ 12”)}$$

In which the variables are defined in equations (EQ 1) and (EQ 2), with the initial condition of reservoir at minimum power pool level at the end of the time series. The equations are solved recursively backwards, beginning at the end of the time series data, up to the initial period.

Once the continuous power and firm energy are identified by the backward simulation procedure, the following parameter is calculated for the time-series:

$$PT(i,j) = \Delta V(i,j) Hef(i,j) \quad \text{(“EQ 13”)}$$

In which:
i, j: indexes for the year and month of the time series.
PT(i,j): monthly value of the variation on stored effective potential energy in the reservoir.
ΔV(i,j): monthly value of the variation on storage during the period.

Hef(i,j): monthly average product of net head and efficiency of the power-plant (turbines, generator and transformers combined).

Estimation of the Variation in Stored Volume of Reservoir

The calculation of $\Delta V(i,j)$ involves two variants, defined as: unrestricted variation (A10) and restricted variation (A20) of stored volume, as follows:

a) A10—Unrestricted variation of stored volume in reservoir. It is calculated prior to the imposition of the inequality constrains on the stored volume from (EQ 2), restated below for ease of reference:

$$\Delta V = Qinf\Delta T - Qtp\Delta Tp - Qtb\Delta Tb + (KrR - KeEv)\text{Area} - Qeco\Delta T - Qloss\Delta T.$$

b) A20—Restricted variation of stored volume in reservoir. It is calculated after the imposition of the inequality constrains on the stored volume (EQ 12):

$$V\text{min} \leq Vi \leq V\text{max} \quad (\text{"EQ 12"})$$

$$\Delta V = Vf - Vi \quad (\text{"EQ 14"})$$

If the inequality constrains are not binding, the two calculated values, unrestricted (A10) and restricted (A20), are equal.

Estimation of the Average Net Effective Head

The net effective head is the product of net head and efficiency of the power-plant. The net head is defined in equation (EQ 8) restated below, and the efficiency is a function of the net head and unit flow in the turbines.

$$HEF = Hef \cdot ef_g \quad (\text{"EQ 15"})$$

$$H = \text{Elev} - HL - TW \quad (\text{"EQ 8"})$$

In which:

HEF: Net effective head, indexed for peak and base power.

$ef_t$: Efficiency of the turbines, indexed for peak and base power.

$ef_g$: Combined efficiency of the generators and transformers, it is presumed constant throughout simulation.

The average net effective head is a composite measure over the time period, weighted on the duration of peak and base load. The equation is the following:

$$HEF\text{avg} = (HEFpTp + HEFbTb)/24 \quad (\text{"EQ 16"})$$

In which:

HEFavg: weighted average net effective head over the period.

HEFp: net effective head on peak power.

HEFb: net effective head on base power.

Tp: duration of peak power.

Tb: duration of base power.

Data Processing of the Composite Monthly Reservoir Parameter PT to Obtain the Maximum Monthly Values The control value for the estimation of the Rule Curve is the maximum envelope of the monthly values of the PT-Parameter, that is:

$$PTX(j) = \max(PT(ij)), i=1,n \quad (\text{"EQ 17"})$$

In which:

i,j: indexes for the year and month of the time series.

PTX(j): maximum value of PT parameter for month j, over the entire series.

n: duration of the time series, years.

This process is done for the two variants of the PT parameter, the unrestricted and restricted case. Each case gives an envelope to be used in the estimation of the 2-Parameter Rule Curve Estimation of the End-of-Month Level for the 2-Parameter Elevation Rule Curve The estimation of the end-of-month level proceeds after the extreme maximum monthly values of the PT parameter is calculated. The calculations follow the inverse procedure to that which gave origin to the PT parameter, and are described below:

For any given month or time period:

a) Define initial reservoir level: Any value ranging between the minimum and maximum power pool levels. To obtain the full range of end-of-month storage, the calculations must be repeated with initial level varying between the extremes, with the adequate variation to obtain a good definition of the curve.

b) Define the extreme values of the effective rainfall and evaporation: The parameter RE(i,j)=+Kr R(i,j)−Ke Ev(i,j) is the effective contribution of the rainfall and evaporation to the mass balance equation. Use the time series available to estimate REmin(j), the minimum monthly value of this parameter to use in the mass-balance equations.

c) Estimate the variation in storage to calculate the required end-of-month storage for all the initial reservoir levels required, considering the generation of continuous power and firm energy only. The equations used are, for any given month and initial reservoir level:

$$\Delta V = PTX/Hef \quad (\text{"EQ 18"})$$

$$Vf = Vi + \Delta V - RE\text{min Area} + Qeco\Delta T + Qloss\, \Delta T \quad (\text{"EQ 19"})$$

$$V\text{min} \leq Vf \leq V\text{max} \quad (\text{EQ 3})$$

In which $\Delta V$: variation in storage from the beginning to end of month.

PTX: monthly extreme value of the PT parameter for the month.

Hef: average effective net head for the period, considering the generation of continuous power and firm energy only.

Vi: reservoir storage at the beginning of the month, associated with the initial level.

Vf: reservoir storage at the end of the month.

REmin: minimum value of the effective contribution of rainfall and evaporation, for the month.

Area: average surface area of the reservoir during the period.

d) Use the level-area-storage curve to determine the end-of-month level for the Rule Curve. Once the storage at the end of the month is calculated, use the level-area-storage curve to estimate the reservoir level that defines the Elevation Rule Curve.

Sample Calculations

Provided here is the complete calculation of the 2-Parameter Rule Curve, in line with the calculations proposed by the USACE Reference to develop their Rule Curve, are discussed. First, there are the data requirements, then the processing of the data with the backward simulation to generate the control parameters, and, finally, the estimation of the values of the 2-Parameter Rule Curve for each period and range of values within the admissible levels in the reservoir. The experimental site is the Tayucai reservoir, a site under study in the Upper Caroni Basin, in Venezuela.

Data Requirements

For optimal results, the data should be be the most complete and up-to-date available, covering the hydrological aspects, the characteristics of the reservoir and power-plant, and other water demands to and losses from the reservoir.

Hydrology:

The hydrological data includes the total monthly streamflow into the reservoir, as well as the data for direct monthly rainfall to and evaporation from the reservoir. The length of the record period should be as long as possible. The data is taken from the appropriate sources or estimated from the hydrological modeling of the basin. FIG. 4 shows the monthly and annual means of total inflow, and the monthly rainfall and evaporation with annual total. The value of the parameter Kr, effective rainfall is 0.95; the value of the Ke parameter, effective evaporation, is 0.80.

Reservoir:

The data required for the reservoir are the following:

a) Level-area-storage curve: It is taken from the appropriate topographical maps, or from bathymetric studies of existing reservoirs. The data can be presented in tabular and graphical forms. The interpolation between data points can be made with a line segment, or with the aid of a curve-fitting procedure. The level-area-storage curve is presented in FIG. 5.

b) Representative Levels: It is required to determine the maximum and minimum levels of the power pool, $EL_{max}$ and $EL_{min}$, to define the usable storage for regulation purposes. These levels define the maximum and minimum storage, Vmax and Vmin, and the usable storage as the difference between the maximum and minimum storage values. For this sample, the minimum power pool level is 340 masl, the maximum power pool level is 380 masl. Minimum storage is 1,456 mill. $m^3$, and maximum storage 9,419 mill. $m^3$, the usable storage is 7,963 mill. $m^3$, which is roughly 10% of the mean annual inflow to the reservoir.

Power Plant:

a) Operating pattern: The operating pattern is fully defined with the following parameters:

Duration of peak time, Tp: 4 hour

Duration of base time, Tb: 20 hour

Ratio between base and peak continuous power, fB: Case 1: 1.00 (base load), Case 2: 0.40 b) Tailwater level: For reaction turbines, the tailwater level is the rating curve (flow vs. level) of the discharge channel. For impulse turbines, the tailwater level is the fixed elevation of the discharge jets into the turbines. In this example, the rating curve of the discharge channel is shown in FIG. 6.

c) Turbines: The turbines are defined by their number, type, design head and flow, the usable range of net head and flow, the ratio of maximum power over rated power, and by the efficiency hill-diagram. The turbines can be analyzed jointly as a single unit or separated, in which case the number of operating turbines varies with the net head, flow and power produced by the power-plant. In any case, the operation of the turbines should be the most efficient.

The power-plant is located at the foot of the dam, with one penstock for each turbine. In this example, design head is fixed at 80 in. The machines are Francis turbines, with the efficiency hill diagrams for a machine of specific speed 344 (metric). Total power output is about 3,800 MW, with several turbines (in the range of 10 to 15 machines). Hence, it is expected that the most efficient operation of the power-plant will provide that the unit flow of the machines will be greater than or nearly equal to the maximum efficiency flow for any given head and total power output. The combined efficiency of the generator and transformer units is presumed constant, equal to 0.96.

d) Head Losses: The power-plant is located at the foot of the dam. The head losses in the penstock are considered constant, equal to 1.5 in.

Other Demands

Other demands include ecological flow (minimum required flow, fisheries, navigation, other uses), and other water demands such as irrigation or urban water supply. In this case, the only demand is maintaining a minimum flow downstream from the power-plant equal to 10% of mean annual inflow, some 250 m3/s, to maintain ecological flow. If the total turbined flow at peak or base times is greater than the minimum required flow of 250 m3/s, no action is taken; however if the turbined flow is smaller than the minimum required, the difference between the minimum required flow and turbined flow is released into the river channel without going through the power plant.

Estimation of the Composite Parameter PT and Maximum Values PTX

Presented here is the backward simulation algorithm, and the calculation of the required parameters, along with the estimation of the USACE Rule Curve, for comparison and combination purposes, as will be seen below. The calculations are made for the two (2) cases indicated: Case 1 (base load) with fB equal to 1.0; and Case 2 (peak load) with fB equal to 0.4.

Backward Simulation:

The result of the backward simulation is presented in FIG. 7, for Case 1 and Case 2, with the continuous power (peak and base) and the firm energy yield estimated for each case.

Composite Parameter PT and Maximum Parameter Value PTX:

FIG. 8 shows the values of the PTX parameters, arranged by month, from the backward simulation. The table shows the maximum value of the parameter, PTX, for Case 1 and Case 2, in the unrestricted (A10) and restricted (A20) variants.

Estimation of the 2-Parameter Rule Curves

FIGS. 9-12 show the estimation of the 2-Parameter Rule Curve for this simulation for both the Unrestricted A10 and the Restricted A20 for Case 1 and Case 2.

Estimation of the USACE Curve

Figure 14:
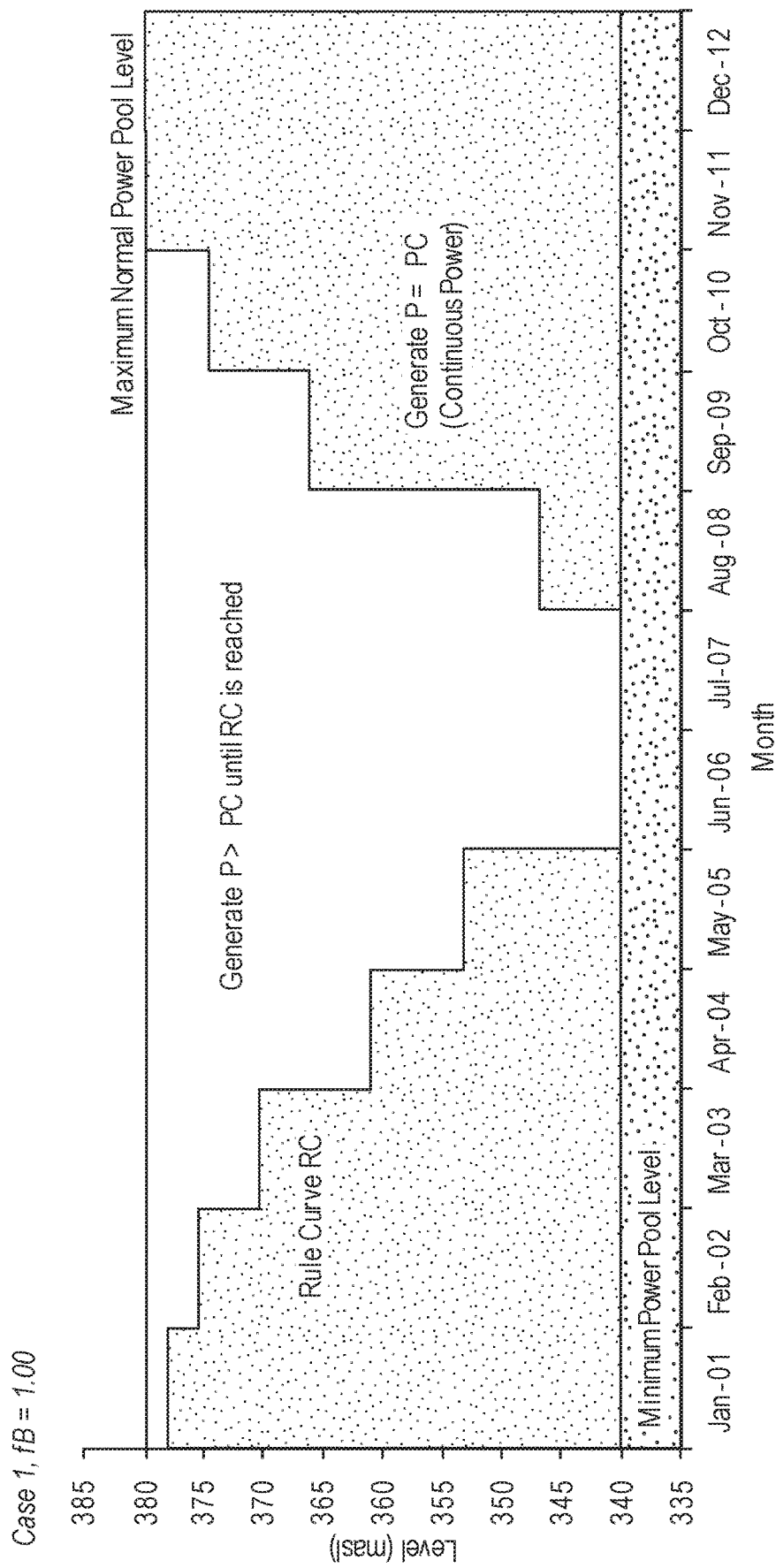
FIG. 14 depicts the USACE hydropower Rule Curves for Tayucai reservoir, Cases 1 and 2; Installed Capacity 3,800 MW; Design Head 80 in; Design Flow 5,667 m3/s.
Figure 14:
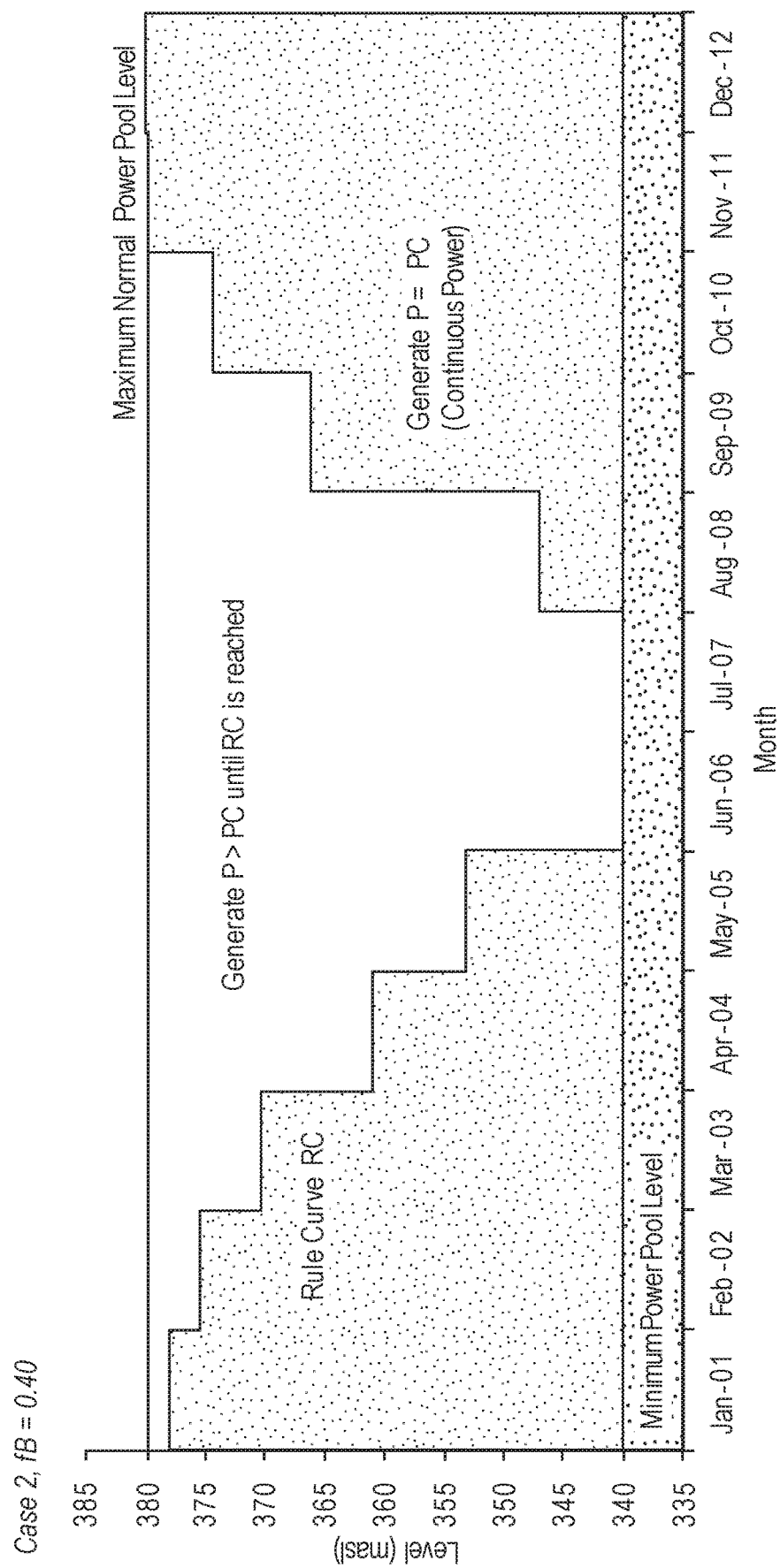

FIG. 13 shows the maximum end-of-month storage and associated reservoir level of the backward simulation, arranged by month, taken from the backward simulation shown for Case 1 and Case 2. In FIG. 14 the maximum values of the end-of-month reservoir levels are reproduced, to form the USACE Rule Curve. As can be seen, the USACE Rule Curves for Cases 1 and 2 are very similar.

Combined Use of the 2-Parameter and USACE Rule Curves

Figure 15:
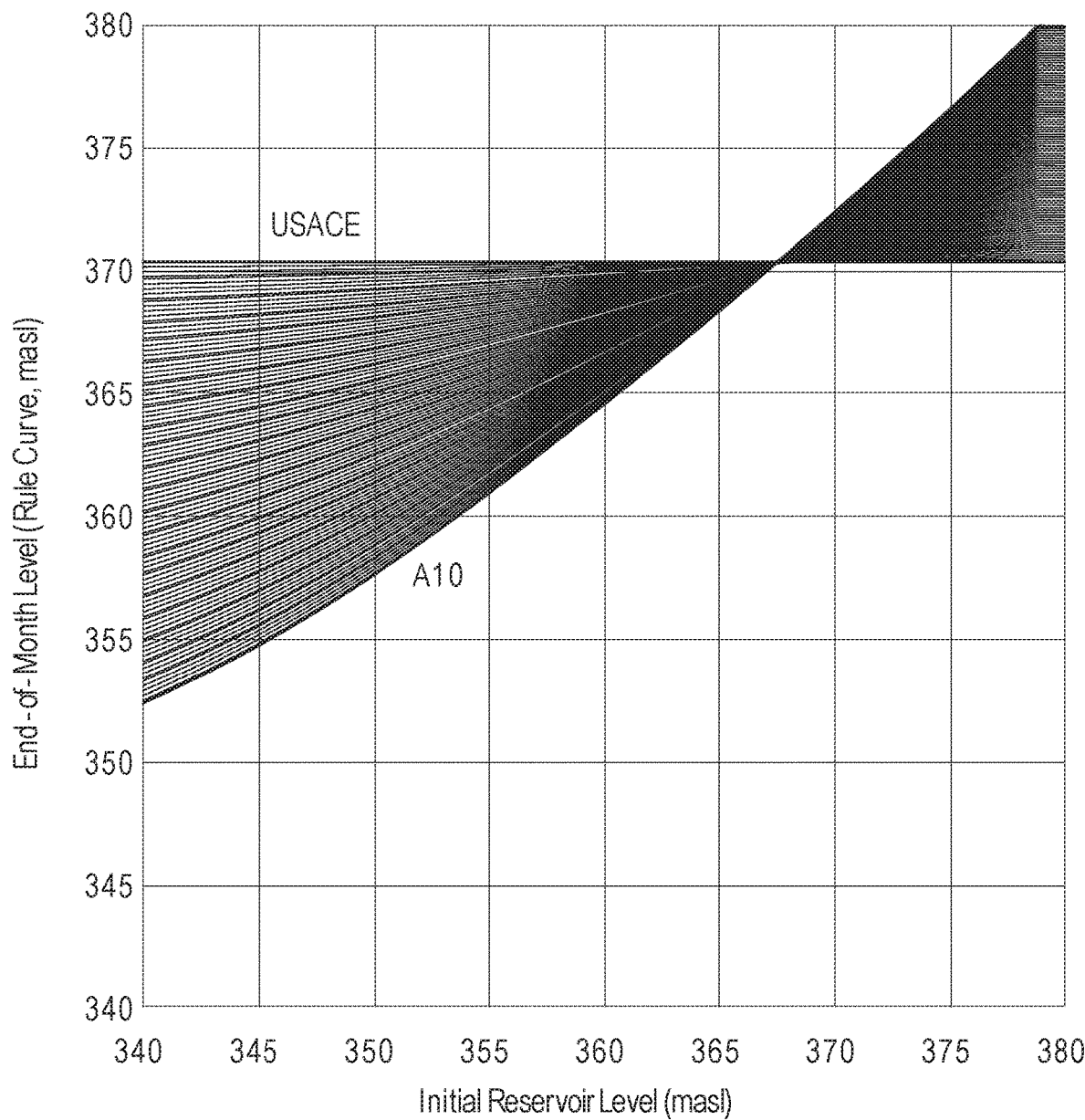
FIG. 15 depicts the 2-Parameter Unrestricted A10 and USACE Rule Curves for Tayucai Reservoir: 3,800 MW, Case 1, Month of March; Design Head 80 in; Design Flow 5,667 m3/s.

The principal purpose of both the 2-Parameter and USACE Rule Curves is to preserve the Finn Energy yield of the reservoir. Both elevation rule curves represent a recommended end-of-month level based on the current time of year and, for the 2-Parameter Rule Curve, on the reservoir level at the beginning of the month. FIG. 15 shows a typical 2-Parameter Rule Curve and the USACE Rule Curve values for the same month. This figure shows the values for the month of march of Tayucai reservoir, Case 1, in which the values of the 2-Parameter Unrestricted A10 Rule Curve range between 352.3 and 380.0 masl, depending on the initial level in the reservoir; while the USACE Rule Curve is a constant at 370.4 masl. The range of levels between the two Rule Curves (shaded region) can be seen as a complementary solution space for a Rule Curve, which can be explored in diverse ways, either at random or methodically.

One form of exploration of the complementary solution space is by making a linear combination of level/storage from the two Rule Curves with the appropriate weights, plus the extreme values (maximum and minimum) of the range. Thus is it formed the Combined 2-Parameter-USACE Rule Curve, which can be tested by simulation to select the most appropriate curve for a reservoir and power-plant operating in a wide range of rated capacity.

Extreme Values

This combined extreme curve is represented by any of the following equations:

Maximum Value: $L_C = \max(L_{2-P}, L_{USACE})$   a)

Minimum Value: $L_C = \min(L_{2-P}, L_{USACE})$   b)

Figure 16:
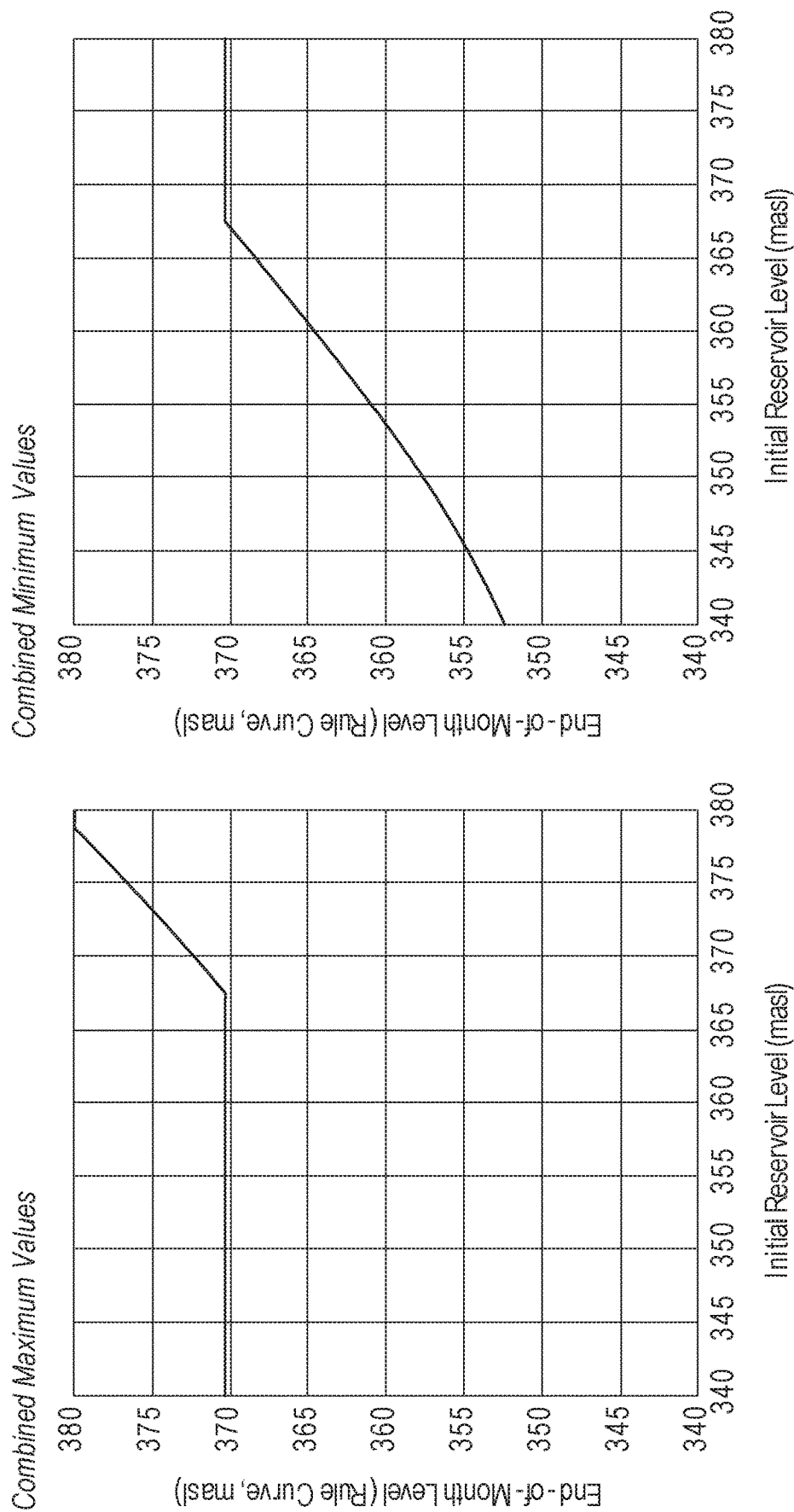
FIG. 16 depicts a combined 2-Parameter and USACE Rule Curves Unrestricted A10 for Tayucai Reservoir; 3,800 MW, Case 1, Month of March; Design Head 80 in; Design Flow 5,667 m3/s.

In which:
$L_C$: Combined Rule Curve Level
$L_{2-P}$: Level of the 2-Parameter Rule Curve
$L_{USACE}$: Level of the USACE Rule Curve FIG. 16 shows a graph of the combined maximum and minimum values for this example.

Linear Combinations

The linear combination of the level/storage is represented by any the following equations:

Linear Combination on Level: $L_C = w\, L_{2-P} + (1-w) L_{USACE}$   a)

Linear Combination on Storage: $S_C = w\, S_{2-P} + (1-w) S_{USACE}$   b)

The Combined Rule Curve level, $L_C$, is then interpolated from the elevation-storage curve.

Figure 17:
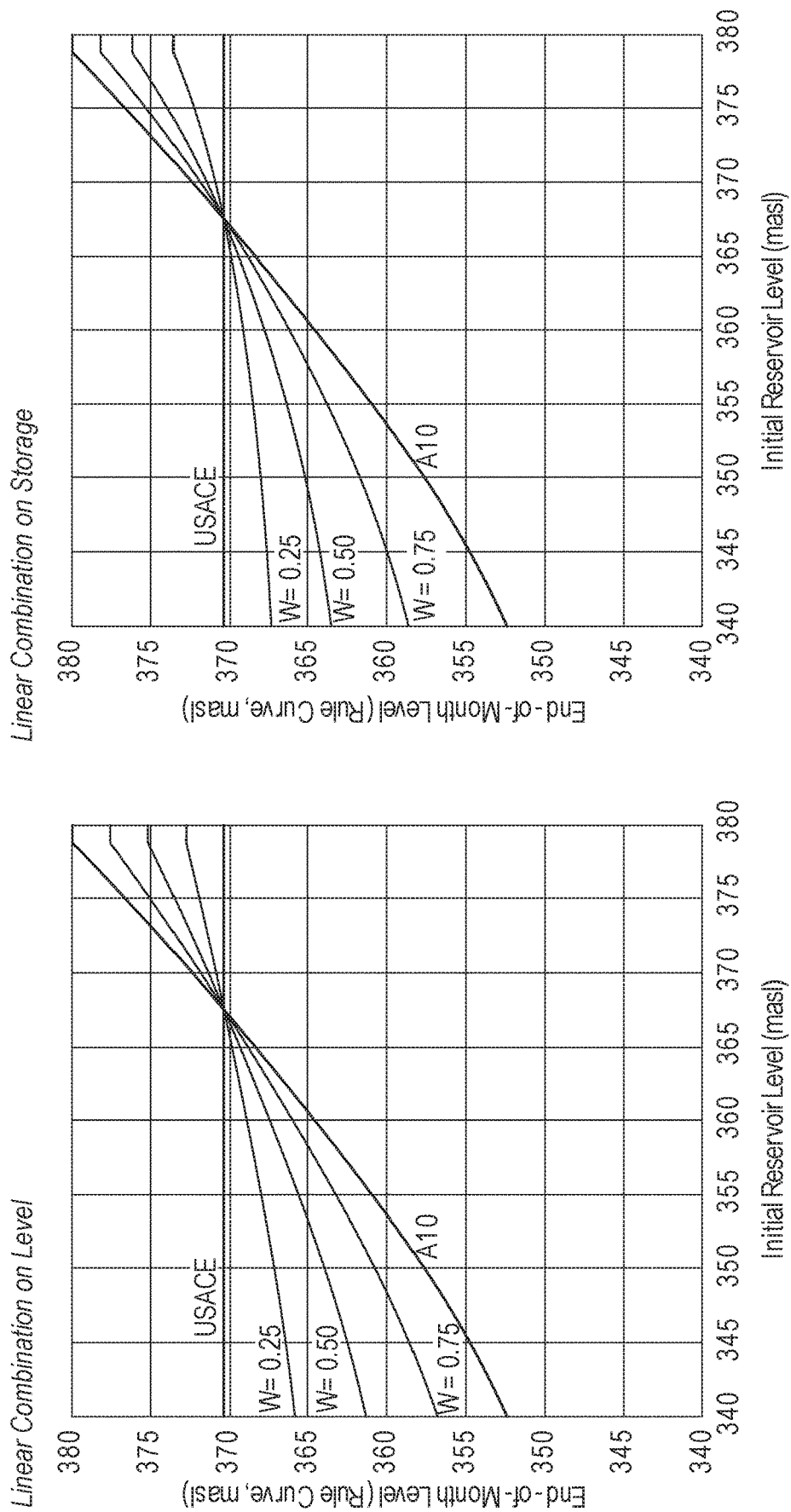
FIG. 17 depicts several linear combinations of the Unrestricted A10 Rule and the USACE Rule Curves, on level and storage with weights 0.25, 0.5, and 0.75, as well as the original A10 and USACE Rule Curves; 3,800 MW; Design Head 80 in; Design Flow 5,667 m3/s.

In which:
$L_C$: Combined Rule Curve Level
$L_{2-P}$: 2-Parameter Rule Curve Level
$L_{USACE}$: USACE Rule Curve Level
$S_C$: Combined Rule Curve Storage
$S_{2-P}$: 2-Parameter Rule Curve Storage
$S_{USACE}$: USACE Rule Curve Storage
w: weight assigned to the 2-parameter rule curve in the linear combination, lies within the normalized range 0 to 1. The weight can be the same throughout the year, or can vary with the month-seasons FIG. 17 shows several linear combinations on level and storage with weights 0.25, 0.50, and 0.75, as well as the original A10 and USACE Rule Curves. A linear combination on level is different than a linear combination on storage due to the nonlinearity of the level-area-storage curve of the reservoirs.

FIG. 18 shows the mean annual energy generated by the simulation of the combination of the extreme values (maximum and minimum) of the 2-Parameter Rule Curves (Unrestricted A 10 and Restricted A20) and the USACE Rule Curve. The maximum annual energy is generated by the use of the 2-Parameter Unrestricted A10 Rule Curve.

FIG. 19 shows the mean annual energy generated by the simulation of the liner combination on levels of the 2-Parameter Rule Curves (Unrestricted A10 and Restricted A20) and the USACE Rule Curve. The weights assigned to the levels of the 2-Parameter Rule Curves vary between 0.1 and 0.9, and are the same value throughout the year.

The simulated results show a smooth, non-linear variation between the energy generated by the 2-Parameter Rule Curves and the USACE Rule Curve as the weight assigned to the 2-Parameter Rule Curve varies from 0.90 down to 0.1. The maximum annual energy is generated by the use of the 2-Parameter Unrestricted A10 Rule Curve.

Linear Combination on Storage

FIG. 20 shows the mean annual energy generated by the simulation of the linear combination on storage of the 2-Parameter Rule Curves (Unrestricted A10 and Restricted A20) and the USACE Rule Curve. The weights assigned to the levels of the 2-Parameter Rule Curves vary between 0.1 and 0.9, and are the same value throughout the year.

The simulated results show a smooth, non-linear variation between the energy generated by the 2-Parameter Rule Curves and the USACE Rule Curve as the weight assigned to the 2-Parameter Rule Curve varies from 0.90 down to 0.1. The maximum annual energy is generated by the use of the 2-Parameter Unrestricted A10 Rule Curve.

In conclusion, the evaluation of the combination of the 2-Parameter and USACE Rule Curves indicates that the 2-Parameter Unrestricted A10 Rule Curve generates the maximum mean annual energy output.

Use of the 2-Parameter Rule Curve

The use of the 2-Parameter Rule Curve can increase total energy output from a single reservoir over the energy produced by using the USACE Rule Curve, while keeping the Firm Energy Yield of the reservoir, over a wide range of rated capacities in the power plant. The example is again Tayucai reservoir, in which the rated capacity of the power plant varies between 2,000 MW and 6,000 MW, with normal power pool level set at 380 masl and minimum power pool level set at 340 masl.

Characteristics of the Power Plant

FIG. 21 shows the general characteristics of the Power Plant, with rated capacities ranging from 2,000 MW up to 6,000 MW. The table contains the design point (head, flow, efficiency) and the range of net head (maximum and minimum). In this example the head varies with the rated capacity, and is calculated considering the level of the reservoir at the center of mass of the useful storage.

Energy Produced

USACE Rule Curve

FIG. 22 shows the energy output generated by Tayucai power plant using the USACE Rule Curve. It shows the continuous power, the firm energy yield, the secondary energy and average energy, as well as the plant capacity factor, ranging from 80% down to 25%. The maximum energy produced is around 15,240 GW-h/year with the installation of 2,480 MW in the power plant, at a plant capacity factor of 70%.

2-Parameter Unrestricted A10

FIG. 23 shows the energy output generated by Tayucai power plant using the 2-Parameter Unrestricted A10 Rule Curve, by itself or in combination with the USACE Rule Curve. It shows the continuous power, the firm energy yield, the secondary energy and average energy, as well as the plant capacity factor, ranging from 80% down to 30%. The maximum energy produced is around 17,460 GW-h/year with the installation of 4,600 MW in the power plant, at a Plant Capacity Factor of 43%.

The continuous power and firm energy generation does not change, however the average energy output increases by 2,240 GW-h/year which represents an increase of 15% over the maximum average energy and of 26% over the maximum secondary energy generated by the USACE Rule Curve alone.

2-Parameter Restricted A20

FIG. 24 shows the energy output generated by Tayucai power plant using the 2-Parameter Restricted A20 Rule Curve. It shows the continuous power, the firm energy yield, the secondary energy and average energy, as well as the plant capacity factor, ranging from 80% down to 30%. The maximum energy produced is around 16,980 GW-h/year with the installation of 4,400 MW in the power plant, at a Plant Capacity Factor of 44%.

The continuous power and firm energy generation does not change, however the average energy output increases by 1,740 GW-h/year which represents an increase of 11% over the maximum average energy and of 20% over the maximum secondary energy generated by the USACE Rule Curve alone.

Comparison

Figure 26:
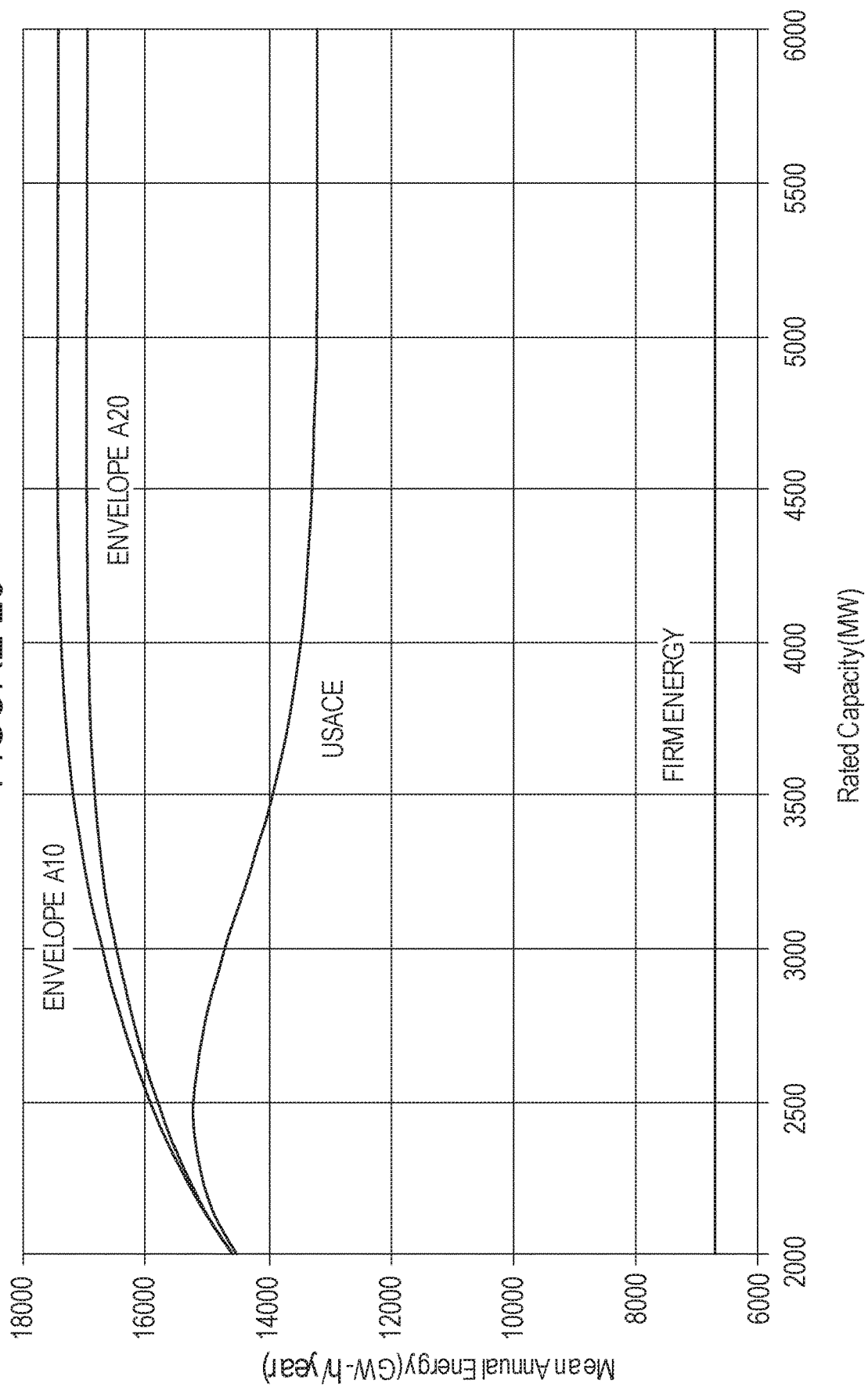
FIG. 26 depicts Mean Annual Energy Generated by use of the Diverse Rule Curves at Tayucai Reservoir.
Figure 27:
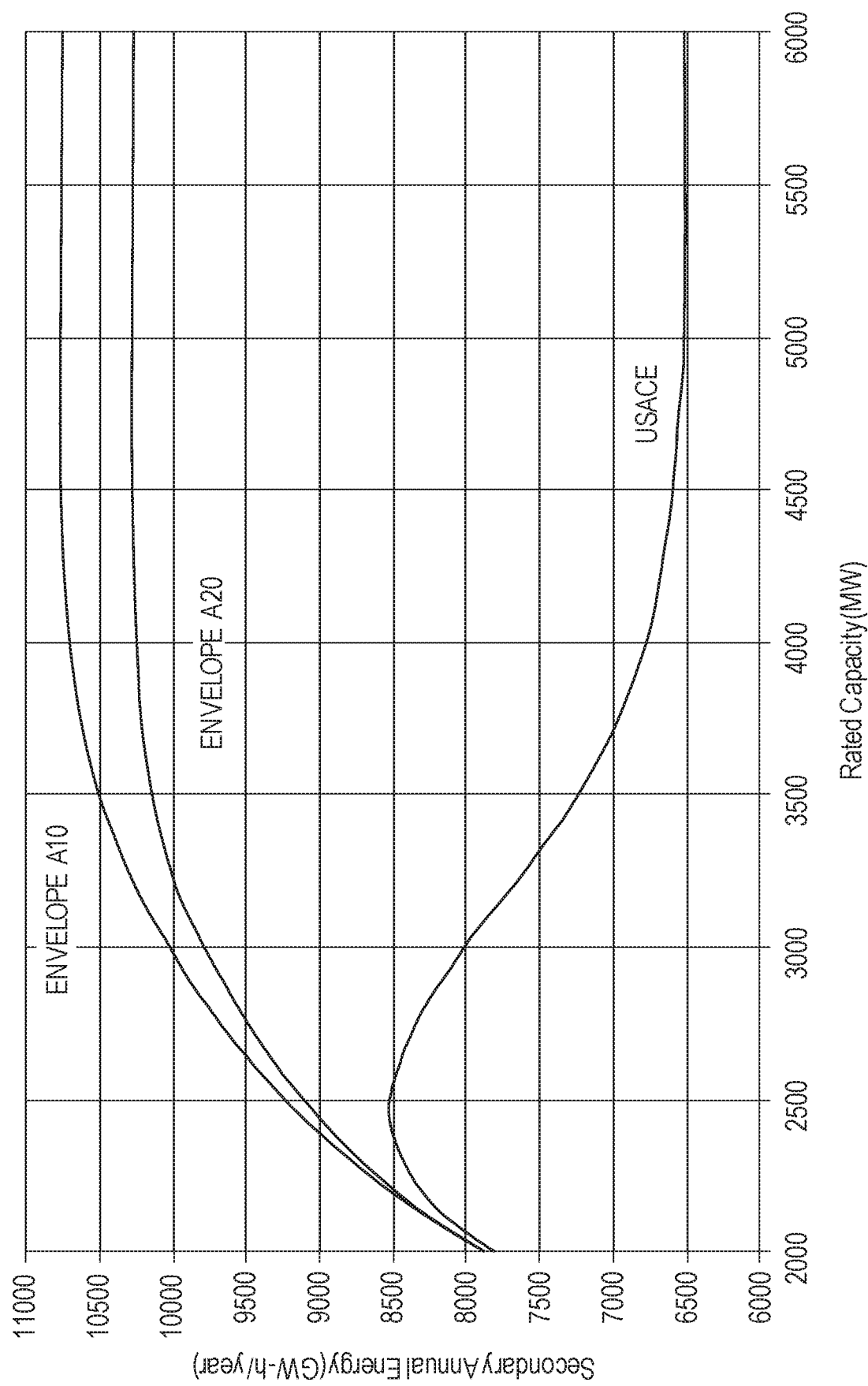
FIG. 27 depicts Secondary Annual Energy Generated by use of the Diverse Rule Curves at Tayucai Reservoir.

FIG. 25 shows the total energy (firm, average and secondary) generated by Tayucai Reservoir over the entire range of rated capacities (2,000 to 6,000 MW) analyzed. It shows the energy generated by the three rule curves: the USACE, and the envelope (maximum values) of the energy generated by the Unrestricted A10 and Restricted A20 in their diverse combinations (by themselves, as well as the maximum-minimum and the linear combinations with the USACE Rule Curve). The data is plotted in FIG. 26 (Mean Annual Energy) and FIG. 27 (Secondary Energy) over the entire range of rated capacity. Conclusion:

As can be seen, the Unrestricted A10 Rule Curve generates more energy from the reservoir for every rated capacity installed in the Tayucai Power Plant, from a low 2,000 MW (Plant Capacity 80%) to a high of 6,000 MW (plant capacity 30%).

The mean annual energy generated with the 2-Parameter A10 and A20 Rule Curves reaches a maximum value and remains fairly constant near the maximum value generated notwithstanding the increase in rated capacity of the power plant.

The invention claimed is:

1. A method for operating a hydropowered reservoir, the method providing an increase in average annual energy produced by the reservoir in comparison with energy generated by the reservoir when operated in accordance with a Rule Curve generated in accordance with a United States Army Corps of Engineers ("USACE") operational strategy, without reducing annual firm energy yield for the reservoir, the method comprising:

estimating continuous power and firm energy yield of the reservoir in accordance with the USACE operational strategy;

determining a first Rule Curve for the reservoir in accordance with the USACE operational strategy;

determining two variants of a composite monthly maximum parameter for generation of continuous power and firm energy at the reservoir;

generating a second Rule Curve for the reservoir which considers the water level of the reservoir at the beginning of each month and one of the two variants of the composite monthly maximum parameter or a linear combination of the two variants of the composite monthly maximum parameter; and operating the reservoir in accordance with the second Rule Curve.

2. The method of claim 1 wherein the composite monthly maximum parameter represents a monthly maximum effective potential energy withdrawn from, or stored into, the reservoir.

3. The method of claim 1 wherein the step of generating a second Rule Curve takes into account one or more of the following for a given month: (a) expected rainfall into the reservoir; and (b) expected evaporation of water from the reservoir.

* * * * *